(12) United States Patent
Gutsche

(10) Patent No.: US 9,995,284 B1
(45) Date of Patent: Jun. 12, 2018

(54) DEVICE FOR EFFICIENT SELF-CONTAINED INERTIAL VEHICULAR PROPULSION

(71) Applicant: Gottfried J. Gutsche, Mississauga (CA)

(72) Inventor: Gottfried J. Gutsche, Mississauga (CA)

(73) Assignee: Real Automation, Mississauga, Ontario (CA)

( * ) Notice: Subject to any disclaimer, the term of this patent is extended or adjusted under 35 U.S.C. 154(b) by 0 days. days.

(21) Appl. No.: 15/731,077

(22) Filed: Apr. 17, 2017

(51) Int. Cl.
| | |
|---|---|
| *B60K 8/00* | (2006.01) |
| *F03G 3/08* | (2006.01) |
| *F16H 33/08* | (2006.01) |
| *H02K 7/02* | (2006.01) |

(52) U.S. Cl.
CPC .............. *F03G 3/08* (2013.01); *B60K 8/00* (2013.01); *F16H 33/08* (2013.01); *H02K 7/02* (2013.01); *H02K 2207/00* (2013.01)

(58) Field of Classification Search
None
See application file for complete search history.

(56) References Cited

U.S. PATENT DOCUMENTS

| | | | | |
|---|---|---|---|---|
| 3,492,881 A * | 2/1970 | Vanden Auweele | .... | F16H 33/00 74/84 S |
| 3,663,510 A * | 5/1972 | Peterson | .......... | C09D 179/08 524/708 |
| 4,712,439 A * | 12/1987 | North | .......... | F03G 3/00 74/61 |
| 4,928,553 A * | 5/1990 | Wagner | .......... | F16H 33/02 475/267 |
| 5,086,664 A * | 2/1992 | Wagner | .......... | F16H 33/02 475/111 |
| 5,182,958 A * | 2/1993 | Black | .......... | F03G 3/00 180/7.1 |
| 5,473,957 A * | 12/1995 | Navarro | .......... | F03G 3/00 74/61 |
| 5,890,400 A * | 4/1999 | Oades | .......... | F03G 3/08 74/570.2 |
| 6,938,713 B1 * | 9/2005 | Tahara | .......... | B60K 6/485 180/65.26 |

(Continued)

*Primary Examiner* — John D Walters
*Assistant Examiner* — Hilary L Johns

(57) ABSTRACT

A device for efficient self-contained timely sequential vehicular inertial thrust drive is presented comprising two in opposing motion direction internal frequency modulated mechanical oscillators using the simultaneous and combined effort of straight line and rotational inertial reluctance of flywheels. The oscillator's mass motions are obtained with a motor-generators imbedded into large backrest flywheels reciprocally exerting pulsed drive actions and dynamic braking action onto rotors. The motor generators are controlled by a manually tunable electronic controller allowing the fine tuning of the mass motions for finding the highest thrust efficiency. The oscillator's frequency modulation is obtained with an internal reaction less angular mutual reciprocal torque pulse exertion by the motor between the large backrest flywheels against the fast spinning rotor. The internal cycle is recycling unused backrest flywheel energy back into the power supply allowing for an efficient propulsion cycle without energy loss.

3 Claims, 24 Drawing Sheets

(56) References Cited

U.S. PATENT DOCUMENTS

| | | | | |
|---|---|---|---|---|
| 7,008,276 B1* | 3/2006 | Laul | ............... | B63H 19/00 244/171.5 |
| 7,108,095 B1* | 9/2006 | Washington | ............ | B60L 11/16 180/165 |
| 7,181,987 B2* | 2/2007 | Hamady | ................ | A63B 21/22 74/5.12 |
| 7,579,757 B2* | 8/2009 | Kulah | ............... | F03G 7/08 310/339 |
| 7,604,565 B2* | 10/2009 | Lee | .................. | B60K 6/36 477/3 |
| 8,322,471 B2* | 12/2012 | Schroll | ................. | B62D 57/00 180/54.1 |
| 8,430,192 B2* | 4/2013 | Gillett | ................... | B60K 1/04 180/2.2 |
| 8,448,952 B2* | 5/2013 | Serbu | ................ | B60G 17/0195 188/267 |
| 8,506,876 B2* | 8/2013 | Suzuki | .................. | B22D 37/00 266/236 |
| 2006/0249955 A1* | 11/2006 | Stanciu | .................... | F03G 3/00 290/1 R |
| 2010/0276222 A1* | 11/2010 | Gramling | ............ | B60K 6/105 180/165 |
| 2011/0156522 A1* | 6/2011 | Babcock | ................ | H02K 21/24 310/156.43 |

* cited by examiner

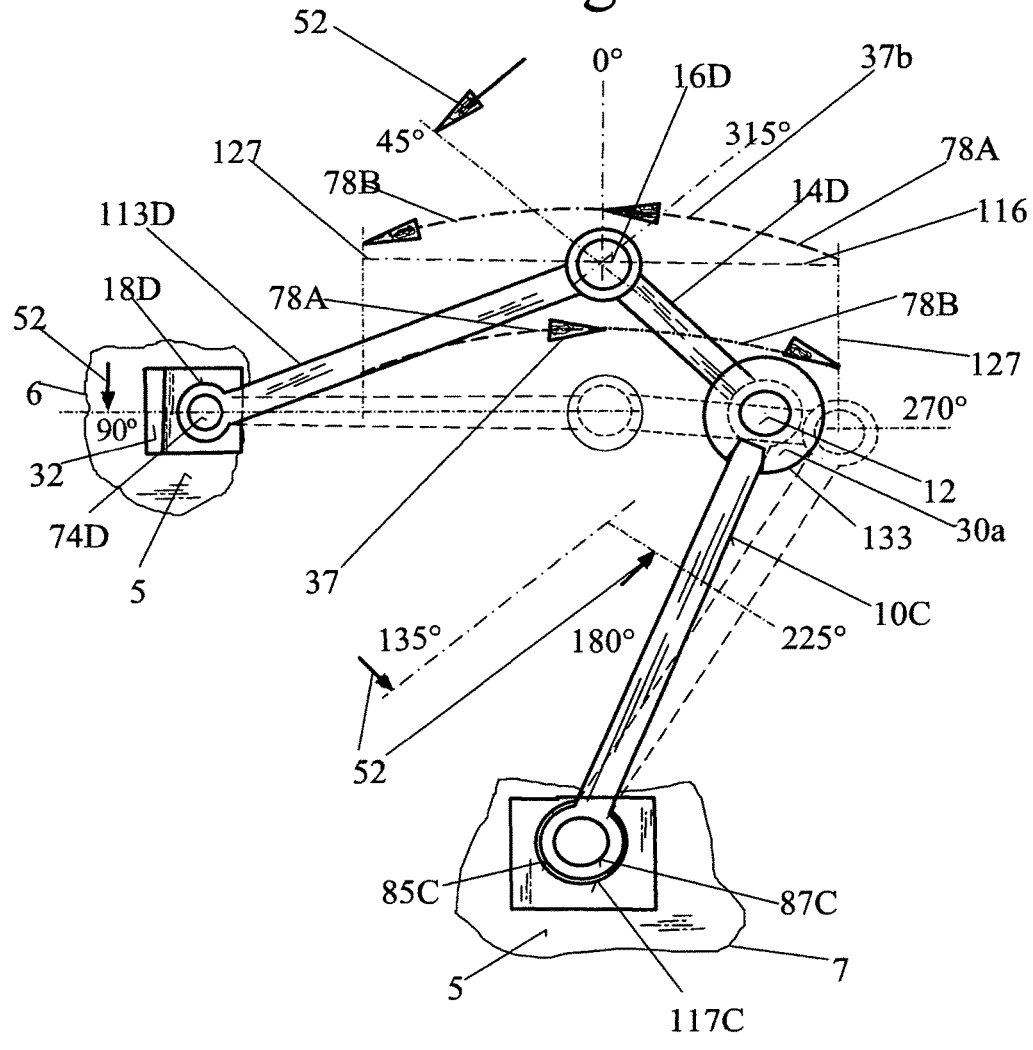

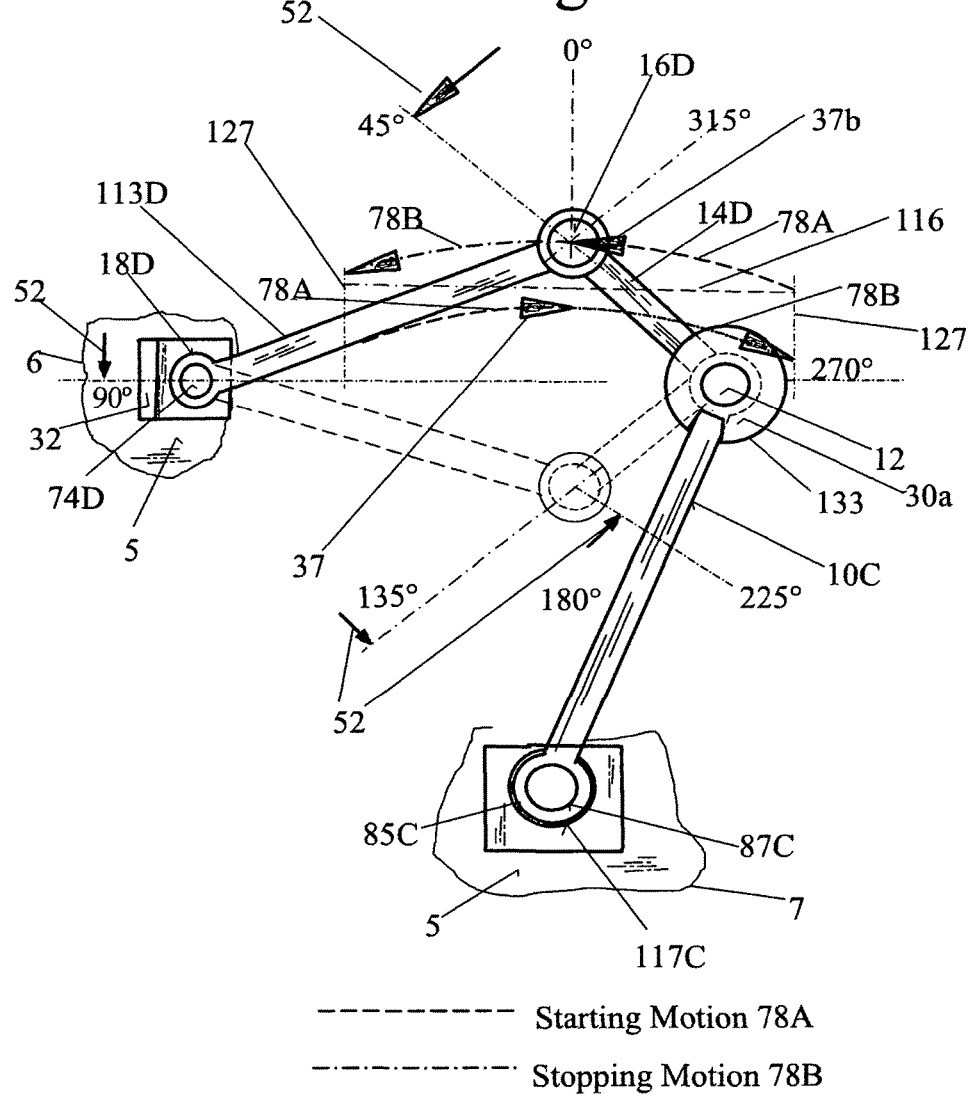

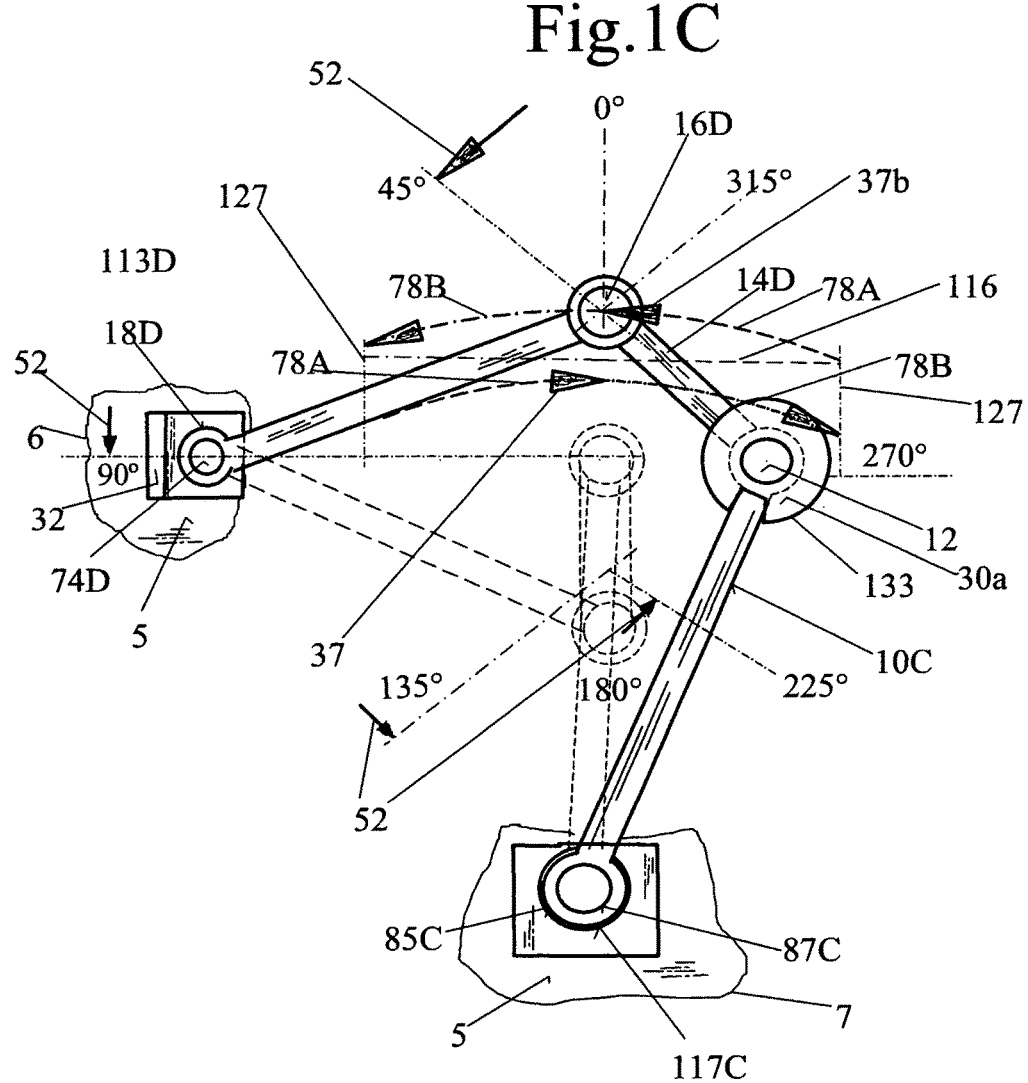

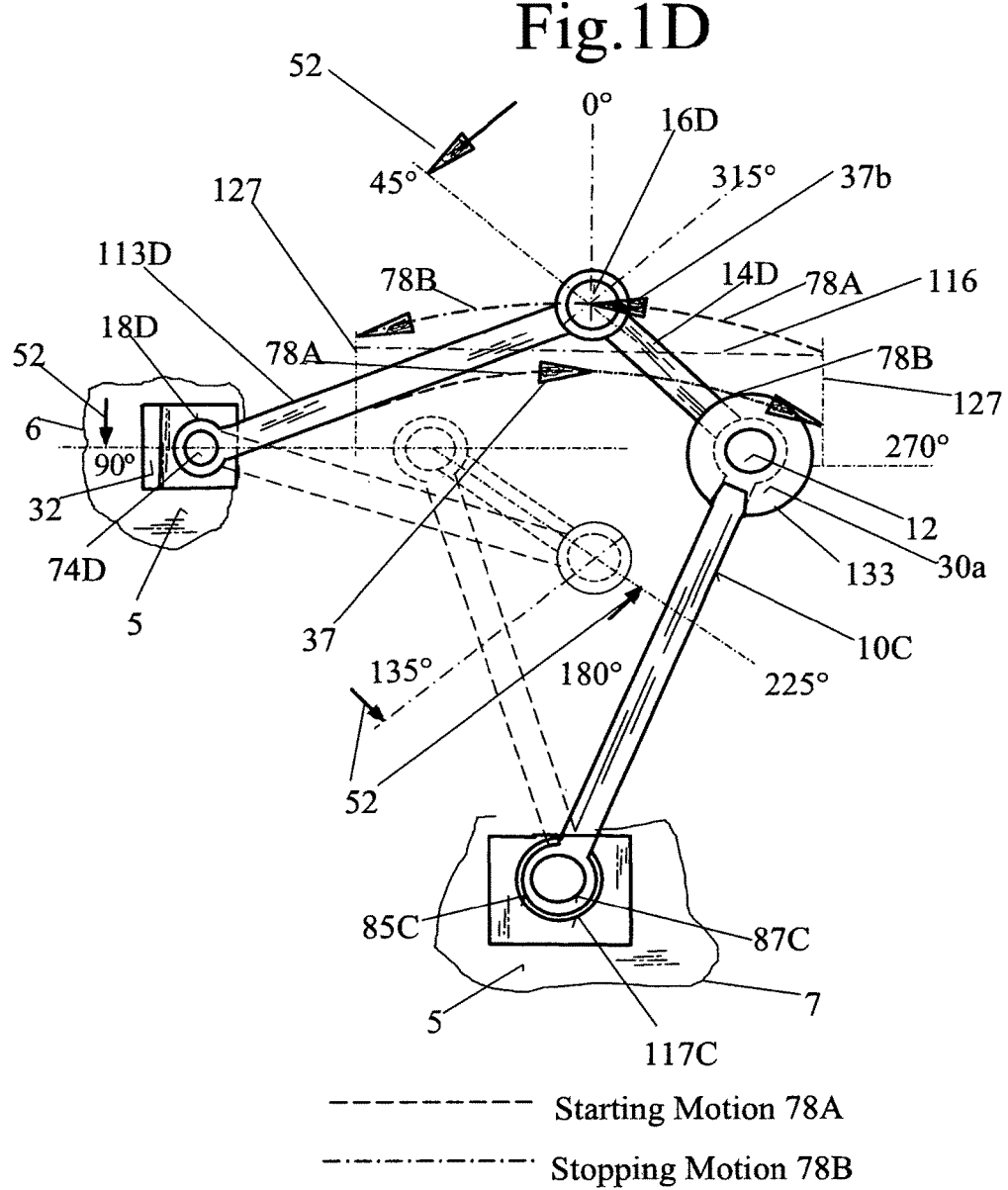

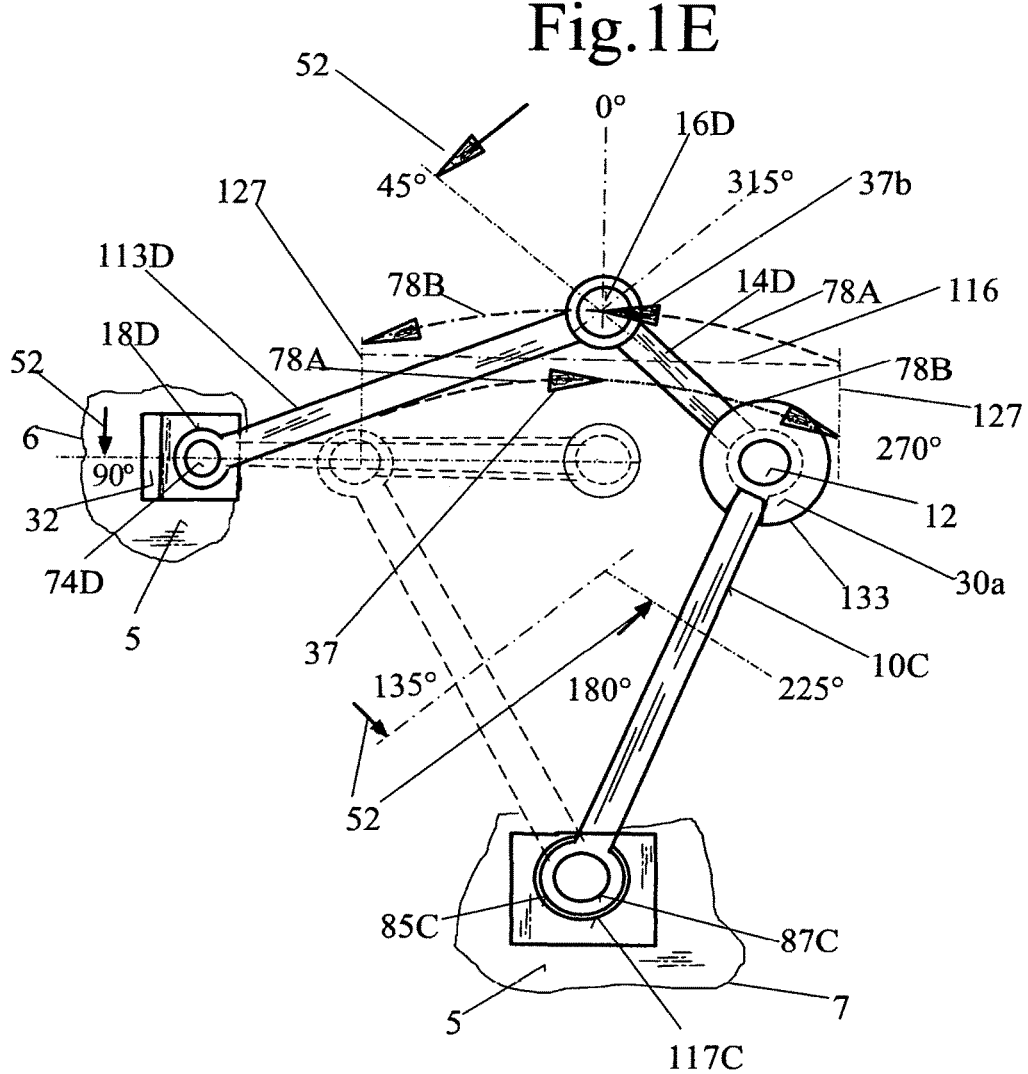

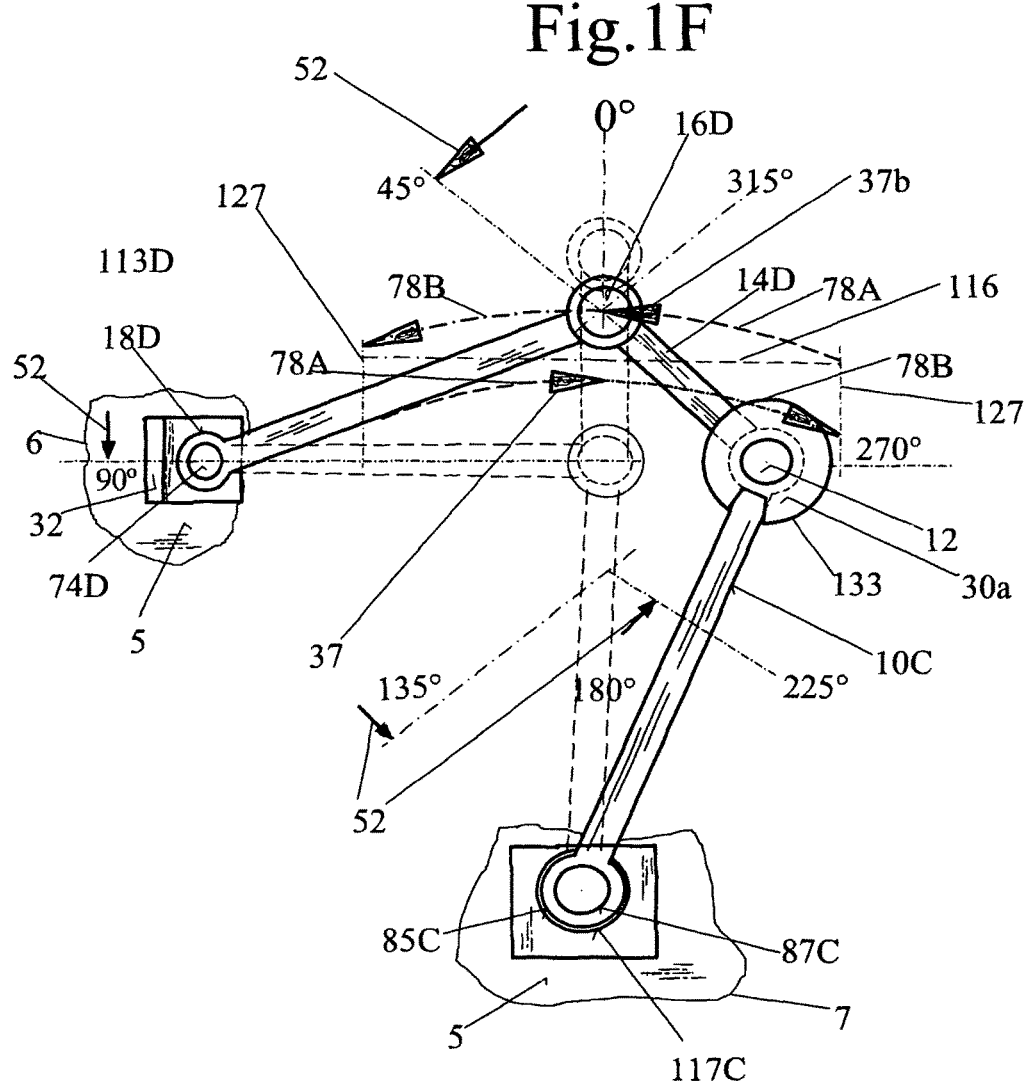

- - - - - - - Starting Motion 78A
- · - · - · - Stopping Motion 78B

Motor-Generator alternating Drive Pulses

Motor-Generator Rotor angular speed

FIG.4B
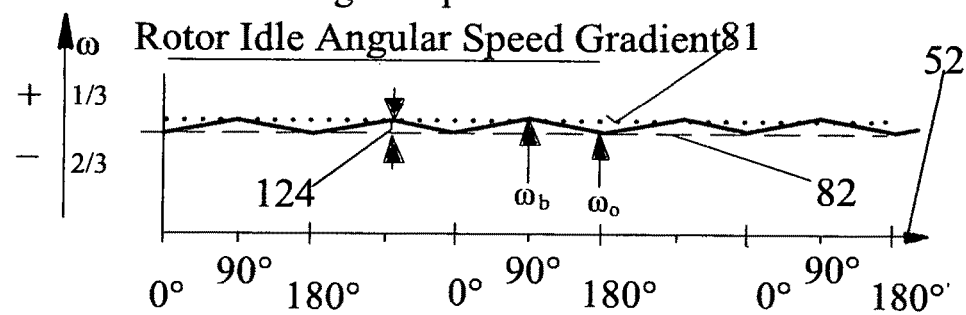
Motor-Generator Rotor angular speed
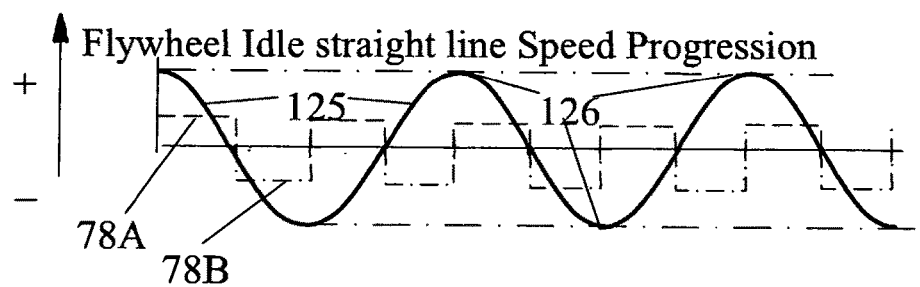

FIG.6
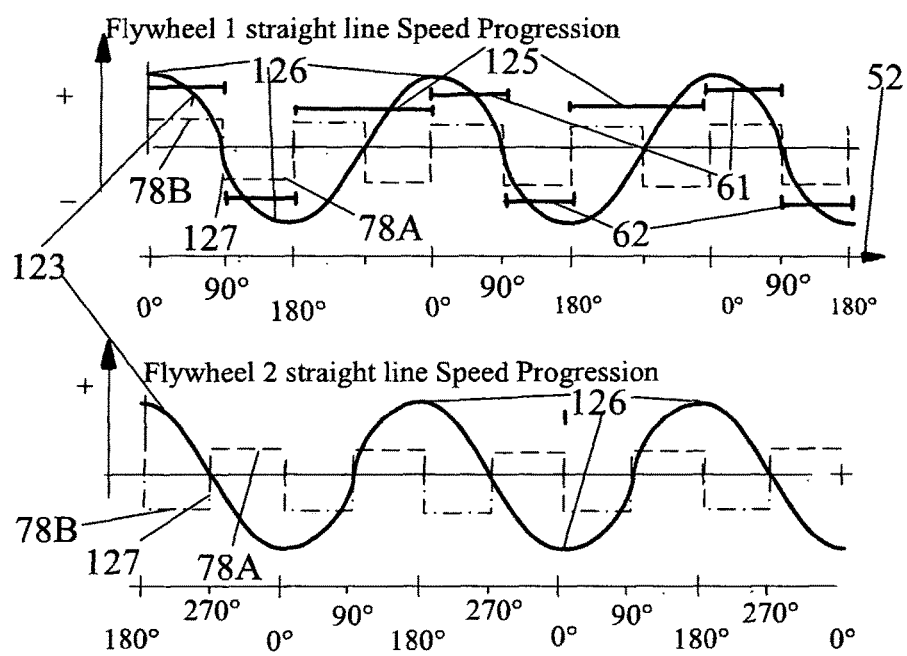
Fig.7
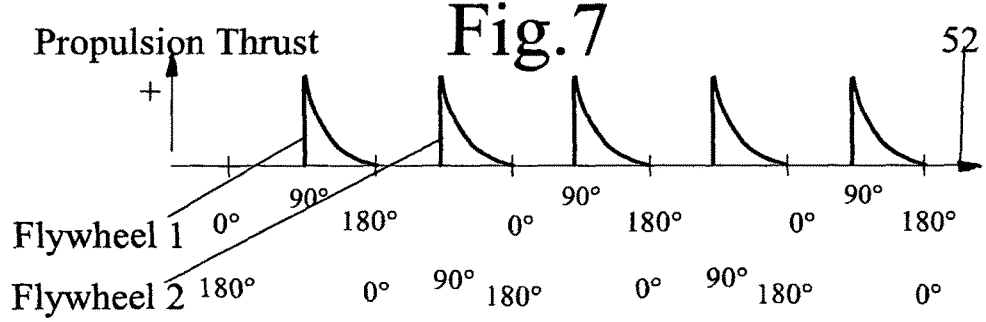
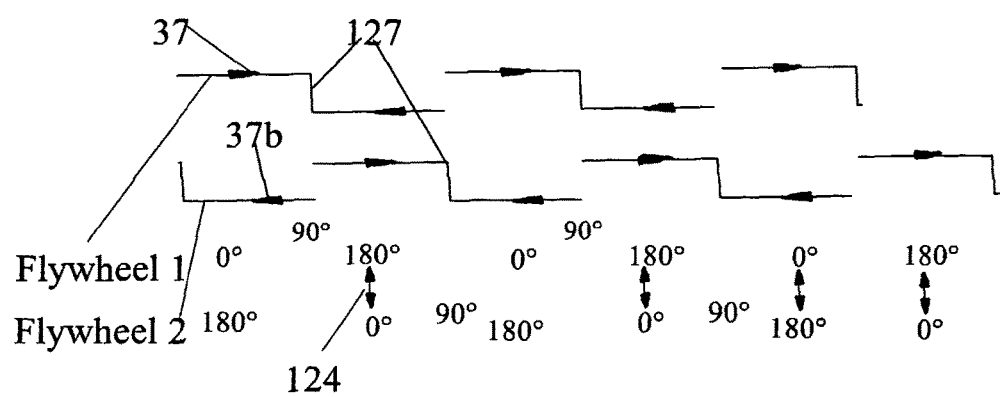

FIG.10
Well-known Formulas-Book-section #, - Prior Art

96 — Centripetal acceleration tethered mass $\alpha = V^2/r$ ; (L 31)

$\omega = V/r$ ; $V = r\omega$ ; $\alpha = r\omega^2$ ; (L30)

¼ turn rotational to straight line displacement s:

97 — $s=r$ at $\alpha=90°$; $\sin\alpha = s/r$ ; $s=r\sin(\omega t)$ ; $s=\sin\alpha r$ ; (L29)

98 — Force at straight line displacement "s" $F = m s \omega^2$;(L60,L62)

99 — ¼ turn constant $\omega$: $Wk/Ke = \frac{1}{2}mr^2\omega^2$ ; (M3,M4)

100 — $\alpha = d^2s/dt^2$ ; (L32)

¼ rotation time for variable $\omega$: $t_{¼} = 2\pi/(\frac{1}{2}(\omega+\omega_{orgin}))4$;(L28)

101 — Mean value force for a variable $\omega$:

102 — $\overline{F}=mr(\frac{1}{2}(\omega+\omega_{orgin}))/ 2\pi/(\frac{1}{2}(\omega+\omega_{orgin})4 =$ ; (M1)

$\overline{F}=mr2(\frac{1}{2}(\omega+\omega_{orgin}))^2/\pi$

103 — $\overline{Wk/Ke}=mr^22(\frac{1}{2}(\omega+\omega_{orgin}))^2/\pi$

104 — Moment of Inertia $= I = \Sigma dmr^2$ ; (M15)

105 — Stored Kinetic energy: $Wk/Ke=\frac{1}{2}I\omega^2 =\frac{1}{2}I4\pi^2/t^2$; (M29)

Straight line $Wk/Ke=\frac{1}{2}mV^2$ ; impulse/momentum $p=mV$

106 — Straight line impulse $p= \sqrt{2m (Ke-Ke_{orgin})}$ — 104

107 — Net linear Impulse $p=mr/(\frac{1}{2}(\omega-\omega_{orgin}))$

108

109

110

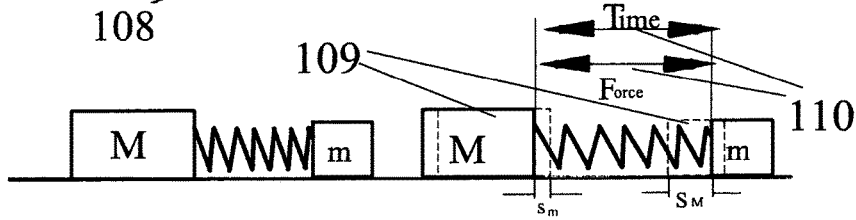

$a_m = F/m$ ; $A_M = F/M$ ; (L22)

$S_m = a_m T^2/2$ ; $S_M = A_M T^2/2$ ; (L19)

$e = Fs$ ; (L19,L32)

$e_m = m a_m S_m$ ; $E_M = M A_M S_M$

111 — $e/E = M/m$ — 112b

112 — $e_{dragloss} = \tau_{drag} 2\pi$ ; $\omega_{max} = \tau/c$ ; $c_{dimension} = [Ns/m]$

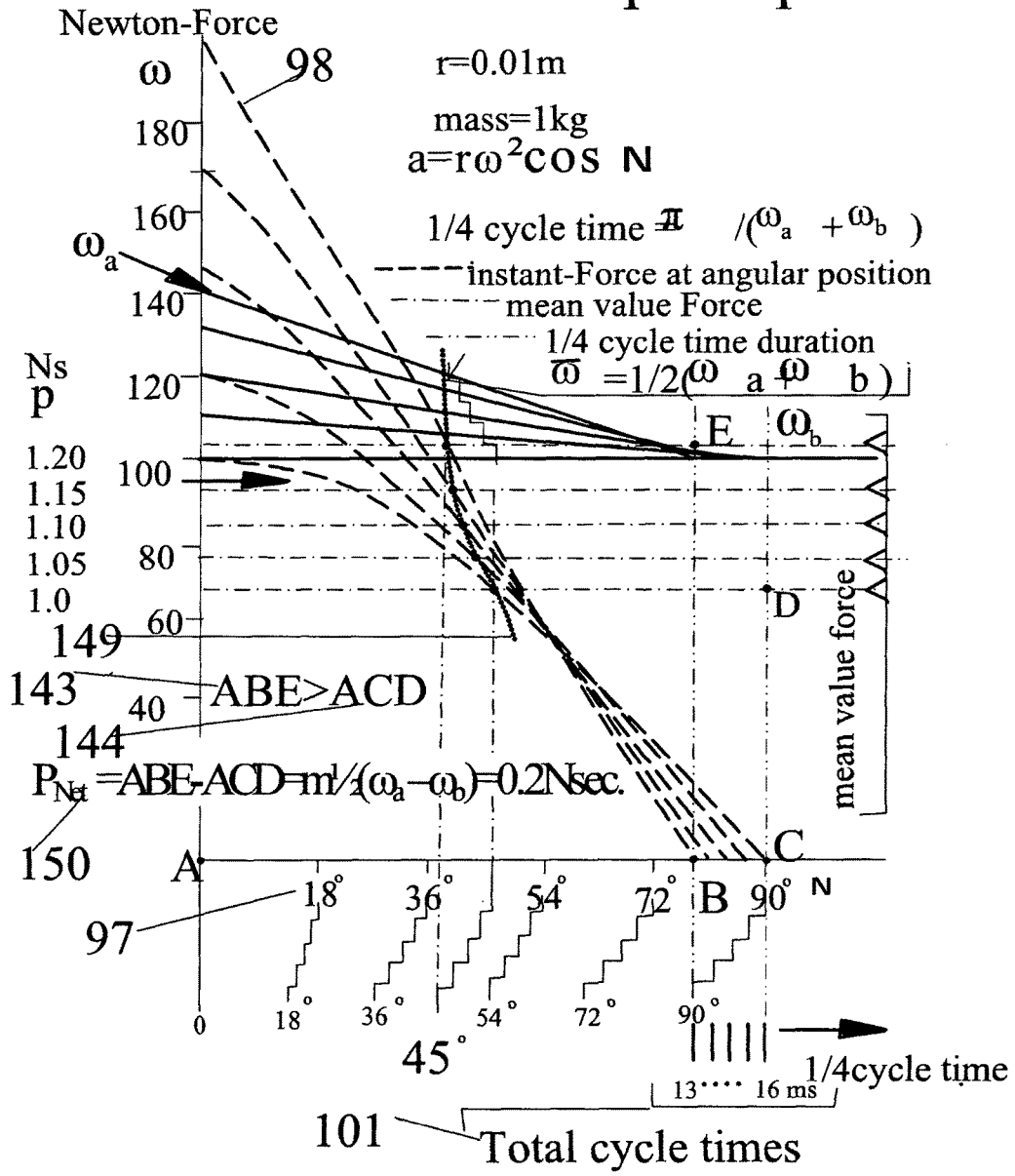

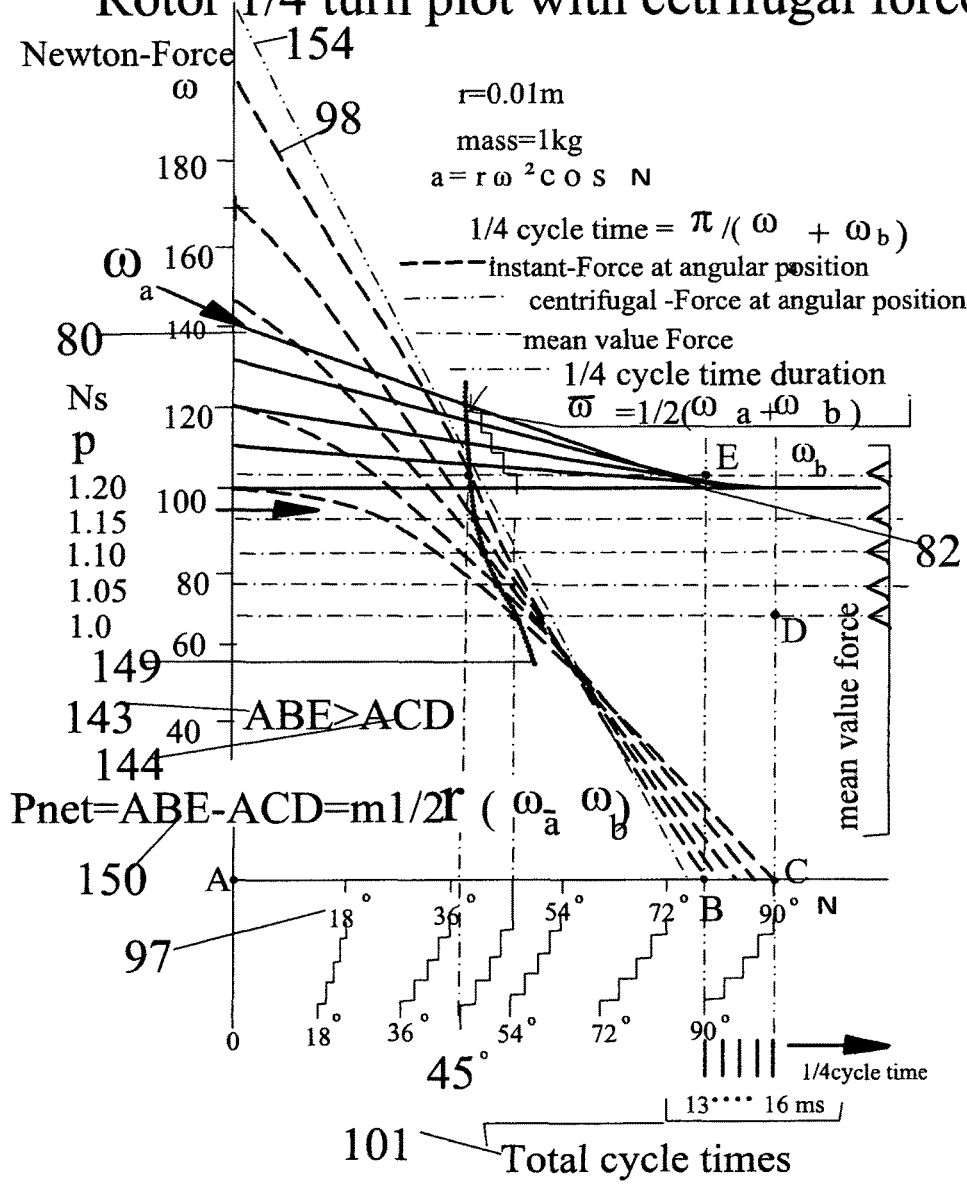

DEVICE FOR EFFICIENT SELF-CONTAINED INERTIAL VEHICULAR PROPULSION

This is a Continuation-in-part (C.I.P) specification for the CIP application Ser. No. 14/120,031

CROSS REFERENCE TO RELATED APPLICATIONS

20150300325 Device for the study of self-contained inertial vehicular
Propulsion generator method within an isolated system
20100242672 Method and device for self-contained inertial vehicular propulsion
20120231433 Teaching aid device for teaching the principles of a self-contained impulse generator method within an isolated system
20080223636 Method and device for self-contained inertial propulsion
20070137420 Method and device for self-contained inertial vehicular propulsion
20080257079 INERTIAL PROPULSION DEVICE
20080168862 INERTIAL PROPULSION DEVICE
20050109138 Inertial propulsion drive
20050005719 Method for generating a non-inertial coriolis force and its application to an internal propulsion device in a closed system
20040159090 Hydromagnetic inertial propulsion

STATEMENT REGARDING PRIOR DISCLOSURE BY THE INVENTOR OR A JOINT INVENTORS

Create Space self publishing Platform:
1. Proving Propulsion without Traction, Proving Propulsion without Expulsions, Proving Inertial Propulsion Physics. Author: Gottfried Gutsche. Date: Apr. 23, 2013
2. Charting the Passage into the Universe by Proving Inertial Propulsion Physics. Author: Gottfried Gutsche. Date: Jan. 20, 2014.
3. The Building Plan for Inertial Propulsion based on Newton's foreseen exception to his Third Law. Author: Gottfried Gutsche. Date: Mar. 9, 2014
4. Inertial Propulsion Explained with Formal Physics, real Mechanics and four Proofs. Author: Gottfried Gutsche. Date: Oct. 11, 2014
5. Inertial Propulsion; the quest for thrust from within. Author: Gottfried Gutsche. Date: Nov. 19, 2014
6. Inertial Propulsion. Author: Gottfried Gutsche. Date: Dec. 13, 2015
7. Inertial Propulsion; how the energy cycle simulates mass expulsion with real impulses. Author: Gottfried Gutsche. Date: Feb. 19, 2016
8. Inertial Propulsion; the internal frequency modulated mechanical oscillator. Author: Gottfried Gutsche. Date: Oct. 16, 2016

FIELD OF THE INVENTION

The present invention relates to a device for developing a self-contained timely sequential potential energy work output thrust drive in a predetermined direction. The invention is using well-known engineering principles depicted in FIG. 10, wherein the applicable formula book reference sections are indicated in brackets; in particular, it applies to the simultaneous combined kinematic effort of variable rotational 105 and strait line motion kinetic energy 106 contained in pairs of flywheels inertial mass motions, wherein a regenerative drive under control of machine logic provides the flywheels' variable kinetic energy 103. Furthermore, the invention applies to the physics principle of the derivation of the gravitational pendulum, the proposition XXIV XIV published with the second principia book in 1713; wherein the derivation is the force passing a distance applied to equal arc section displacements of the pendulum motion. These physics principles are applying to the present device and are congruent to a tethered inertial mass within a 90° (¼) turn arc motion displacement, wherein the centripetal acceleration $\alpha=(V \times V)/r$ 96 passing the 90° (¼) turn is proportional to the sinusoidal reflected straight-line force 98 exerted by the tethered inertial mass onto every straight-line motion positions 97, and this force passing a distance is also the transferred straight-line motion kinetic energy magnitude 106. From this proportional relationship the average of the mean value of the combined rotational to strait line coupled flywheel motion variable force 102 and energetic work 103 is derived by sinusoidal complex plane projection of each 90° ¼ turn rotational position 97:

Work/Kinetic energ=$2/\pi \times$flywheel straight-line motion inertial mass$\times$(rotational coupling radius$\times$rotational coupling radius)$\times$(average angular velocity$\times$average angular velocity); wherein the $2/\pi$ term is the mean value averaging factor for the variable angular velocity and the algebraic average angular velocity is the angular velocity at the start of the straight-line motion plus the angular velocity at the amplitude of the straight-line motion divided by two. The thrust magnitude 108 exerted by the straight-line motion is the consequence of the isomorphic symmetry 107 between the energetic effort and the performed impulse, 108 p=flywheel straight-line motion 106,116 inertial mass$\times$rotational coupling radius$\times$average angular velocity. The average angular velocity is the angular velocity at the start of the straight-line motion+the angular velocity at the amplitude of the straight-line motion divided by two. Within this impulse calculation the $2/\pi$ averaging factor is cancelling out, and the straight-line velocity amplitude and the displacements length are cyclic repeating invariable parameters. Accordingly, within a rotational to straight-line coupled mass motion section, small fluctuations of angular velocity $d\omega$ 100 generates quadratic fluctuations in the complex plane straight-line energetic effort and proportional fluctuations of real effective straight-line motion impulse. These principles of a mean value centripetal force 98 for every rotational position 97 is proven with a geometric angular speed plot passing an angular displacement within a time 101 duration projected onto a plain is depicted in FIG. 11, FIG. 8B wherein the impulse is proportional to the geometric area circumscribed by points ABE 143 is greater than area ACD 144 and impulse area ABE is approximately 1.2ACD. Furthermore, the principle of a mutual and reciprocal separation of two unequal inertial mass depicted in FIG. 10 showing bodies 109, 110 accelerated by a mutual force and mutual time duration 110 is applying to the present invention, wherein the reciprocal acceleration and the reciprocal acceleration distance is proportional to the reverse ratio of the separating inertial mass magnitudes 111. Accordingly, the root cause potential energy causing the mutual inertial mass separation is also distributed proportional to the reverse ratio of the separating masses. The principle of a mutual and reciprocal separation of two unequal inertial mass bodies accelerated by a mutual force and mutual time duration is applying to the present invention, wherein the reciprocal acceleration and the reciprocal acceleration distance is proportional to the reverse ratio of the separating inertial mass magnitude 111. Accordingly, the root cause potential energy causing the mutual inertial mass separation is also distributed proportional to the reverse ratio of the separating masses. Because of this energy domain functionality of the present invention all math and logical considerations must be in the energy domain also called within the displacement domain analysis.

BACKGROUND OF THE INVENTION

The earliest example of using the combined effort of rotational and straight-line motion kinetic energy to produce a large straight-line force is the carriage mounted medieval catapult called "Trebuchet". The carriage of the Trebuchet is not only used for positioning but its main function is to improve the projectile range. The improvement in range of this catapult was due to the simultaneous combined effort of straight-line and rotational kinetic energy and the time spaced delayed lever action of the whip attached to the throw arm and the comparative delay developing the recoil action compared to the instant release of the projectile. This principle of delayed lever action applying to rotational dynamics is used by the present invention, wherein the self-contained projectile impact occurs temporally before the full effect of the rotational reactive impulse develops; this timing delay is opening the technological possibility to minimize the reaction impulse. The simultaneous combined straight-line and rotational motion of the trebuchet has similarities to the present invention wherein the projectile is logical congruent with the body-mass of the vehicle and the carriage is operating within the vehicle.

In relation to the carriage mounted Trebuchet example are the derivation of the pendulum cycle time formula published in anno 1673: $T=2 \times \pi \times sqrt \times (L/g)$; wherein the derivation is based on the potential kinetic energy of the pendulum bob, Work/Kinetic energy=mgh.

Furthermore, is applicable to the derivation of the gravitational pendulum published in 1713 contained within the second Principia book, the Proposition XXIV XIV. This derivation is based on the incremental horizontal distance of the pendulum bob to the vertical line of the pivot point in relation to equal spaces arc motion distances; wherein the acceleration is: $\alpha=(d \times d) \times s/d(t \times t)$ resulting in a vertical acceleration 98 of the pendulum bob for every incremental distance "s" at: $a=(\omega \times \omega)s$, 98, 99, 100. The presented force time plot in FIG. 11 is using this derivation.

A further prior art of the present invention are the experimental clocks placed on ships in the $18^{th}$ century when clockmaker attempted to build clocks capable of sustaining the local time of Greenwich England for longitude navigation. Clockmakers were confronted by an intriguing problem. It seems, no matter how ingenious such clock escapement mechanisms were devised they either advanced or retarded in comparison to the Greenwich local time, which of course means the clocks gained kinetic energy or depleted kinetic energy. It was determined that the complex motion of the ships was causing a change in clock kinetic energy. Since the ship to clock energy transfer relationship is a documented reality, then it can be argued with accuracy: Because of the reversibility of physics principles, energy and impulse must be continuously transferable from large clocks mounted within ships in a reversed process motivating a ships' travel motion. Accordingly, the invention of the chronometer clock was a search for the least interaction of a ships motion impinged onto the clocks=escapement mechanisms while the present invention is the identification of a mechanical process having a high kinetic energy transfer magnitude into the motion of a vehicle.

One of the first successful uses of a flywheel combined with a motor-generator for powering vehicular motion was for a public transportation bus called the "Gyrobus" engineered by the Swiss Orlekon company. The flywheel, motor-generator transmission coupled to straight-line vehicular motion principles are also used by the present invention.

Previous known art of self-contained inertial propulsion devices using independent straight-line moving flywheels was primarily focussed toward overcoming the challenge of achieving a net propulsion thrust. The present invention represents a further concept that has the capability to maximise the propulsion forces and reduce the degree of vibrations. These improvements are achieved with flywheels containing integral regenerative drives which motivate the flywheels simultaneously rotationally and in a straight-line by means of rotational-to-reciprocating transmissions, wherein the motivating thrust is generated with efficient controlled alternating energy flows mutually reciprocally exerted without impediments. Additionally, machine logic facilities generating optimum controlled non-uniform flywheel movements and vehicular directional control is obtaining further improvements in efficiency. The machine logic optimisation allows the device to respond to a changing gravitational load environment as encountered in the pendulum test. Furthermore, the present invention is using independent reciprocal alternating straight-line flywheel movements working in opposing pairs is minimising vibrations caused by the moving masses and allows for a more continuous form of propulsion thrust. Accurate prediction of the propulsion force magnitude is provided with the use of the force vector projection analysis.

BRIEF SUMMARY OF THE INVENTION

It is the objective of the present invention to provide a self-contained inertial propulsion device with directional control.

It is another objective of the invention to provide an inertial propulsion device with a high degree of efficiency.

It is still another objective of the invention to provide an inertial propulsion device with low vibration characteristic and high internal angular speeds.

It is a further objective of the invention to use a low cost high efficient motor-generator control circuit for the demonstration and study of inertial vehicular propulsion principles.

Other features and advantages will be apparent from the following description with accompanying drawings.

DESCRIPTION OF THE DRAWINGS

FIG. 1A-FIG. 1F is depicting the detailed top view of the propulsion device first guidance means with cut away flywheel 1A, and rotor 1B for unobstructed view in 45° rotor rotational increment progressions.

FIG. 4B is the angular and straight-line velocity progression for the idle phase of the device without any self-contained impulses.

FIG. 6 is the graphical representation of the straight-line velocity progression in comparison to the direction of motions.

FIG. 7 is the graphical representation of self-contained propulsion thrust in comparison to the straight-line direction of motions.

FIG. 10 is the summary of the Physics formulas applicable to the present device.

FIG. 11 is the internal self-contained force plot in relation to the angular motion and angular speed progressions.

FIG. 11A is the internal self-contained force plot in relation to angular motion speed progression including centrifugal forces.

DETAILED DESCRIPTION OF THE PREFERRED EMBODIMENT

Figure 1:
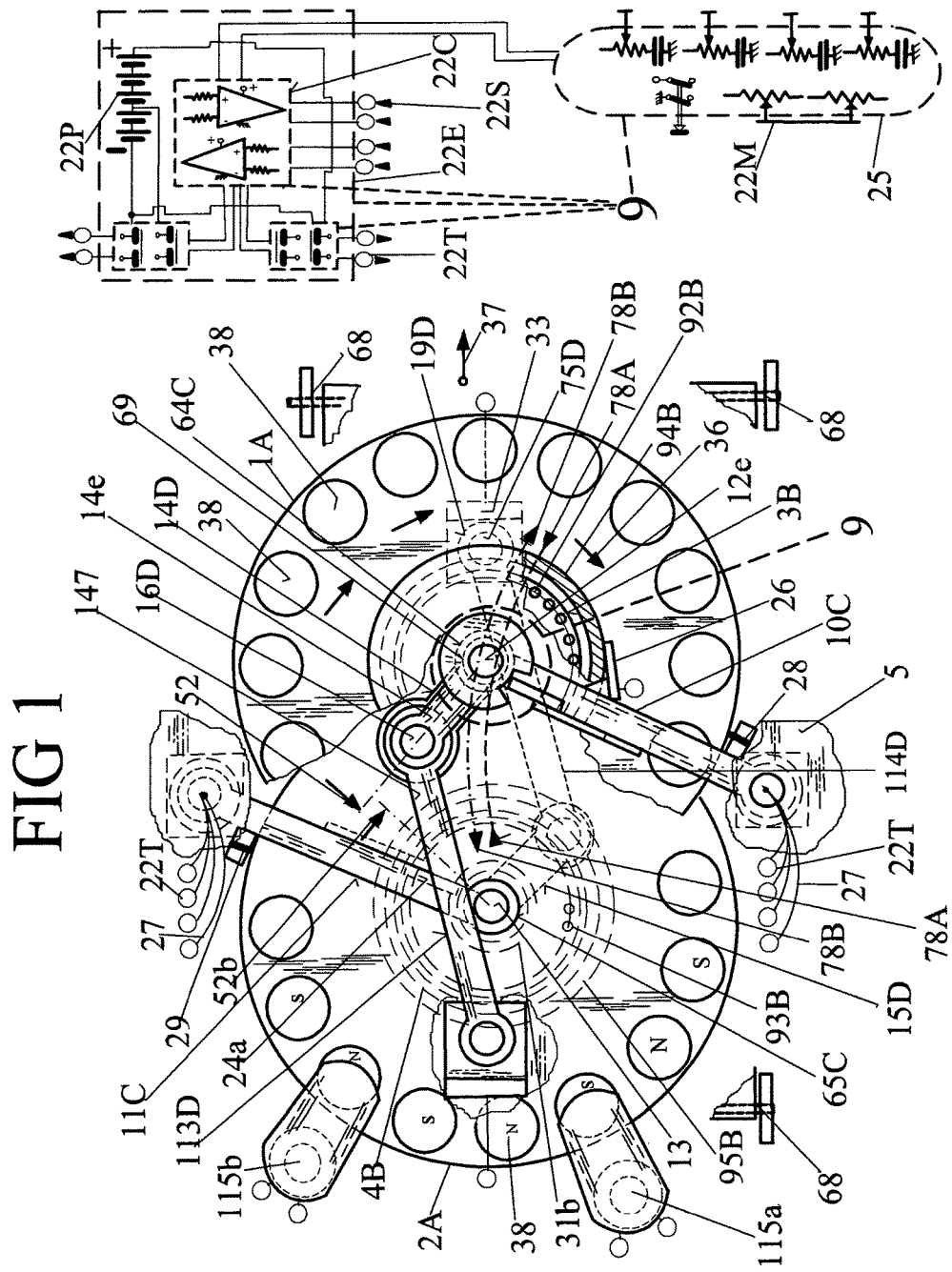
FIG. 1 is depicting the top view of the propulsion device with symmetrical connecting.
Figure 1G:
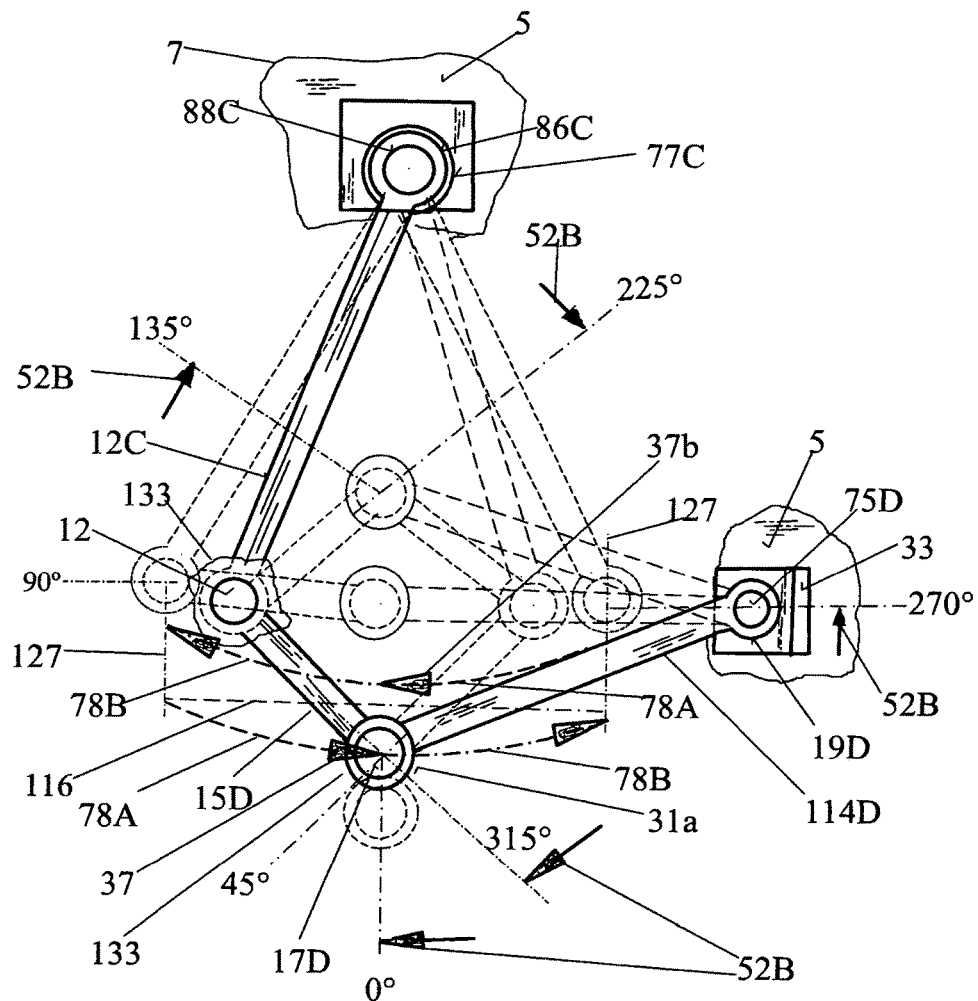
FIG. 1G is depicting the top view of the propulsion device second guidance means with cut away flywheel 2A, and rotor 2B for unobstructed view in 45° rotor rotational increment progressions.
Figure 1H:
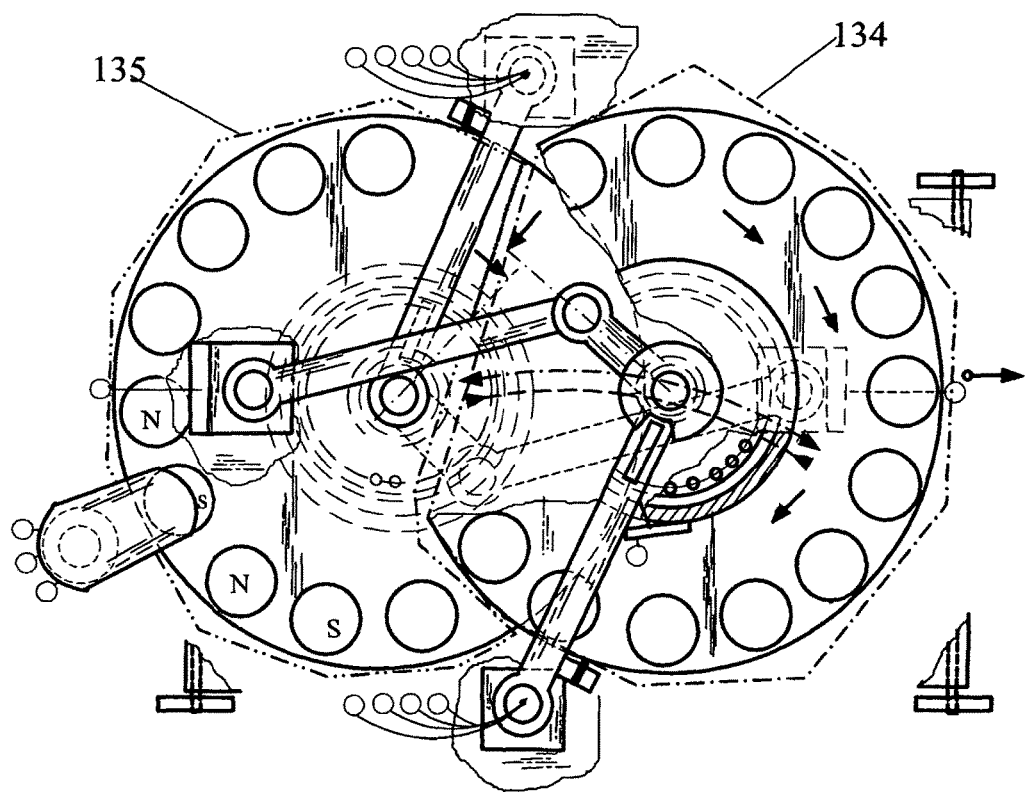
FIG. 1H is depicting the flywheel assemblies inertial mass component inclusion outlines.

Referring to FIG. 1, FIG. 1A, FIG. 1B-FIG. 1G and FIG. 2; the self-contained propulsion device comprising pairs of flywheels, 1A, 2A, having parallel axial orientation, a moment of inertia 104, a straight-line motion inertia 106 and a net straight-line displaceable axial spacing 116. The flywheel 1A,2A rotation 36 is around the central shaft 12,13 by means of a bearing 69,70. Each individual flywheel of the flywheel pair, in comparison to each other's central shaft axis, have a straight-line mutual separating motion 78A followed by a re-approaching motion 78B and have opposite direction of rotation 36; therefore, the straight-line motion of the flywheel pair is a kinetic energy 106 dependent mutual time sequential diametrically opposing cyclic alternating straight-line motion. The flywheel motions comprising a straight-line motion in direction 37 and opposite 37b of vehicular travel direction. The flywheel alternating straight-line motion cycle consists of a starting motion 78A followed by a stopping motion 78B in direction of vehicular travel direction 37 arriving at a transient stop 127, followed by a starting motion 78A followed by a stopping motion 78B opposite vehicular travel direction 37b, arriving at a transient stop 127. The straight-line and rotational motion of the flywheels are vehicular motion directional gradient progressively changing non-uniform movements which accomplishes the net potential energy work output propulsion thrust 108 drive propelling the motion of the vehicle 68. The opposite direction of flywheel rotation accomplishes the cancellation of rotational torque, which prevents the turning of the device around its axis. The turning action, however, is used to steer the device by varying the rotational parameters of the flywheel drives. Each flywheels 1A and 2A contain a substantially embedded well-known electrical regenerative motor-generator B-group comprising motor-generator rotor 3B, 4B secured co-centrical onto central shaft 12 and 13 and field magnets and housing 94B,95B are secured onto the flywheel inner periphery. The motor generator rotor has the dual purpose of delivering directional alternating torque pulses for accumulating and delivering rotational kinetic energy 104,105 within its inherent moment of inertia 104, the rotor kinetic energy is accordingly variable. The rotor kinetic energy is used for all the mechanical motions of the device. The torque pulses delivered by the regenerative drive are simultaneously mutually and reciprocally 111 applied to the flywheel and reciprocally to the motor-generator rotor. The torque pulses have their origin in alternating energy drive pulses delivered from the power supply 22P under control of controller 22C. The group members of the regenerative drive 3B, 4B, 94B, 95B and the flywheels 1A, 2A each are combining their straight-line motion 116 inertial masses forming integral flywheel assemblies indicated with the outline area 134,135 in FIG. 1H. For operational consideration the straight-line motion inertial mass "m" within formula 98, 99, 102, 103,106, 107, 108 applies to each flywheel assembly is determining the magnitude of the straight-line motion work output 103 thrust pulses while the rotational mass moment of inertia 104 of the flywheel 1A,2A and the rotor 3B,4B determine the rotational torque pulses; accordingly, the flywheel assemblies are straight-line motion impulse mechanisms 134,135 indicated in FIG. 1H. The regenerative drive B-group can be of different types of technologies, for example, electrical motor-generator, a fluid motor-pump such as a pneumatic vane motor-pump, hydraulic gear motor-pump or a mechanical clutch and buffer. The selection process for the most suitable regenerative drive technology must consider frictional losses 112, losses gaining prominence with higher rotor angular speed 112b and magnetic hysteresis delay losses Z which are diminishing the net propulsion thrust and limiting the maximum angular speed of the rotor for a given driving energy potential. The side-wall of the flywheel 1A, is cut open to reveal the motor-generator within the flywheel and furthermore the reciprocal relationship of rotor and flywheel axial rotation is revealed. In FIG. 1; for illustrating the essential preferred embodiment of the present invention, a well-known electrical motor-generator rotor 3B,4B with the current carrying conductors 92B, 93B, field magnets housing 94B,95B and the reciprocal relation of the motor-generator rotor rotation 52, 52b and flywheel rotation 36, 111 are shown. The motor-generator B-group supplies regenerative kinetic energy/work pulses to the flywheel assemblies causing the flywheel rotation, and the regenerative motor-generator rotor 90°/¼ turns are causing the progressively changing alternating non-uniform straight-line flywheel assembly motions. The progressively changing non-uniform straight-line and the simultaneous rotational flywheel assembly motions is the source of a dynamic inertial mass back-rest for the unimpeded self-contained exertion of the kinetic propulsion energy, which is fully explained in FIG. 3,4,5,6,7,8,8A,11,12, The operation of an inertial mass backrest can be understood as similar as to the inertial mass backrest used in sheet metal riveting operation which prevents the deformation of the sheet metal. The reason that the riveting action is not deforming the sheet metal, while applying a substantial inertial mass backrest against the sheet metal surface, is that the surplus kinetic energy leftover from the riveting blow of the riveting impact hammer is distributed according to the reverse ratio 111 of the impact hammer mass to the inertial backrest inertial mass; this means that the substantial inertial backrest receives very little kinetic energy and the riveting hammer receives a large amount of rebound kinetic energy. Accordingly, in analogy of the presented propulsion device, during the driving of the regenerative drive, the rotor 3B receives a large amount of rotational kinetic energy and the larger angular inertial mass of the flywheel 1A receives a relative small amount of kinetic energy. Furthermore, the flywheel straight-line motion in relation to the device motion relates to the same reverse ratio of masses: The large mass of the device receives a small amount of kinetic energy and the small mass of the flywheel assembly receives a relative large amount of kinetic energy. The kinetic energy distribution ratio of the simultaneous mutual reciprocal mass motion separation can only be solved with energy considerations, because the root cause of a separating mass motion is energy. Consequently, the operating principle of the presented device is mass motion work-kinetic energy flow, wherein the drive force parameter is proportional the work-kinetic energy feed magnitude spanning the invariable flywheel assembly straight-line mass motion distance. Hence, the drive thrust magnitude is proportional to the square root out of the work-kinetic energy feed magnitude. Accordingly, a flywheel assembly straight-line motion directional gradient kinetic energy flow, in relation to the device motion direction, will exert a net self-contained directional thrust magnitude. The propulsion device further comprises a power-supply 22P and a motion controller 22C,22M,22E,22S,22T, and 25 which contains the machine logic control that controls the electrical power drive pulses, it controls the alternating power drive pulse width angular position timing and maximises the efficiency of the motor-generator drive pulses with manual set adjustments 22M accomplishing optimum flywheel and rotor motions from angular timing information emitted from rotational position sensors and position settings of potentiometers. The present invention uses an advantageous price performance effective technology of the motion controller in form of one single integrated circuit containing four op-amps and resistor/potentiometer timing circuits. Other, more elaborate high priced automated motion controller options are available for controlling the flywheel motions. For example, a single chip micro-controller having a stored program using fuzzy logic or fast PLC programmable logic controller, programmable graphically using ladder logic symbols. While the most undesirable motor control type is the manually set heat dissipative rheostat type. In FIG. 1 only an overview of the present controller and drive function is presented, the full controller details are described in FIG. 9, FIG. 9B. The control function containing a power supply 22P, the solid state DC relays 22E and the controller 22C OP-amp resistor network all are depicted with the usual drawing symbols. For the simplest form of the device, manually adjustable electrical contact type or a power hall switch power commutators 30a,31a mounted onto the central shafts 12, 13 are able to switch pulse width angular position timed power drive pulses to the motor-generators. The controller has an operator control input 25 for manually setting the speed amplitude parameters and timing of the motor-generators alternating drive pulses, for setting the drive energy magnitude parameters and for setting the directional control of the vehicle 68; wherein the method of control is accomplished with the differential variation of the angular duration PWM control and angle parameters of the motor-generator drive pulses with resistor capacitor delay circuits. Power commutator 26 pass power from the flex cable 27 to the motor generator housing slip rings 119 and the flex cable 27 pass control information from the logic controller to the optical flag sensors 23a,23b. For ease of viewing, the supporting frame 5 of the propulsion device is cut away from the attachment point 6,7,8,9 for unimpeded view of the active working elements. The propulsion device further comprises two guidance means C-group comprising members 10C, 11C, 64C, 65C, 76C, 77C, 85C, 86C, 87C, 88C, 117C which provide each flywheel assembly with substantial straight-line freedom of movement 78A,78B guidance, having a net motion length 116 in vehicular travel direction 37. This is clearly depicted in FIG. 1A-FIG. 1G. For the present embodiment, each swing-arm pair 10C, 11C pivoting at each pivot block pair 76C,77C; each swing arm pair is connected by the tie bar 117C providing stiff resilient straight-line motion guidance with minimum mechanical friction or flexing using the pivot block annual guidance surface 87C, 88C. Many other technologies are able to guide the flywheels in straight-line motion but with undesirable friction losses and wear characteristics; for example, linear (straight-line) guides, slider rails, or carriages on guide rails.

Referring to FIG. 1A-FIG. 1G, depicting the top view flywheel assembly net straight-line motion progression 78A, 78B, 116 in relation to 45° rotor angular motion (turn) progressions, wherein the 0° rotational turn position is at 12 o'clock when the radius bar 14D,15D is in the vertical position pointing to 12 o'clock. The two flywheel assembly starting motions 78A, the two stopping motion 78B and the transient stops 127 of the 360° cycle are depicted and clarified. The flywheels 1A,2A and motor generators rotors 3B,4B are cut 133 out for unobstructed viewing.

Figure 1J:
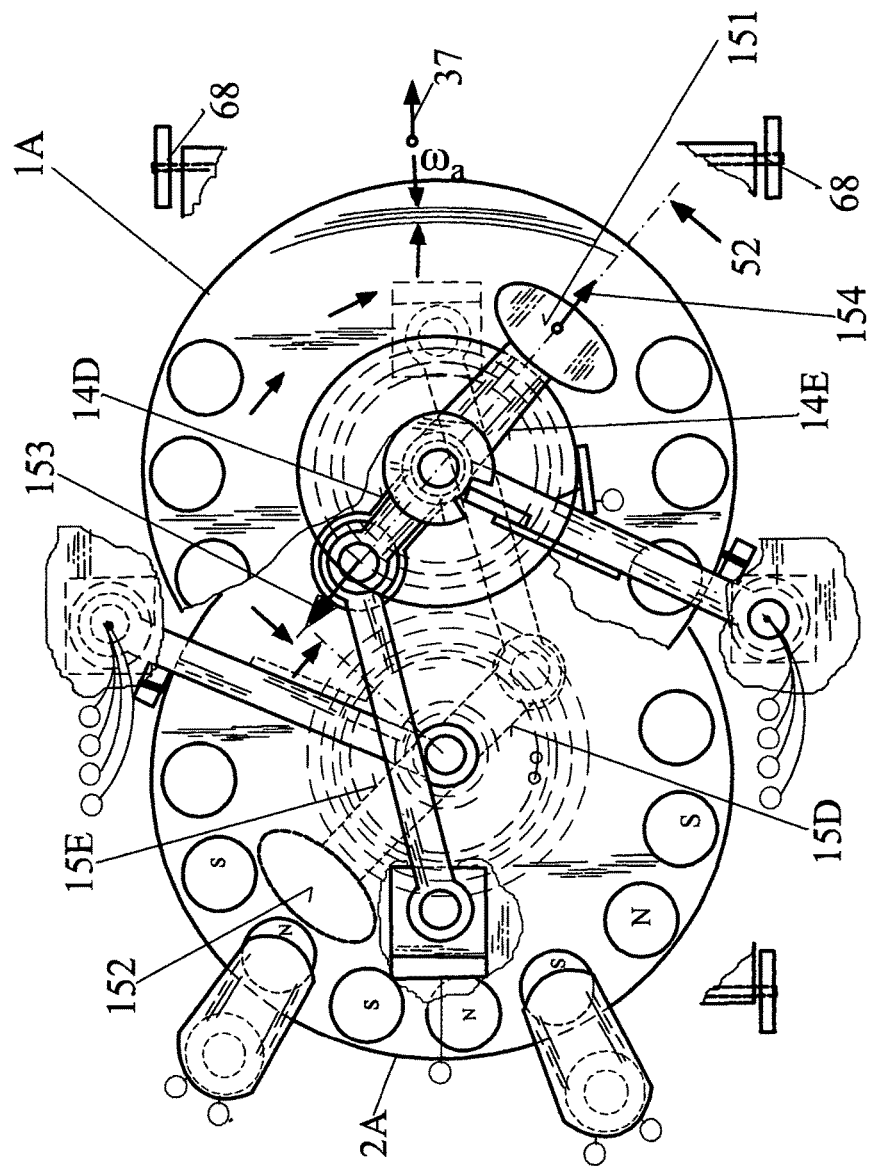
FIG. 1J is depicting the centrifugal force management of the rotating mass system.
Figure 2:
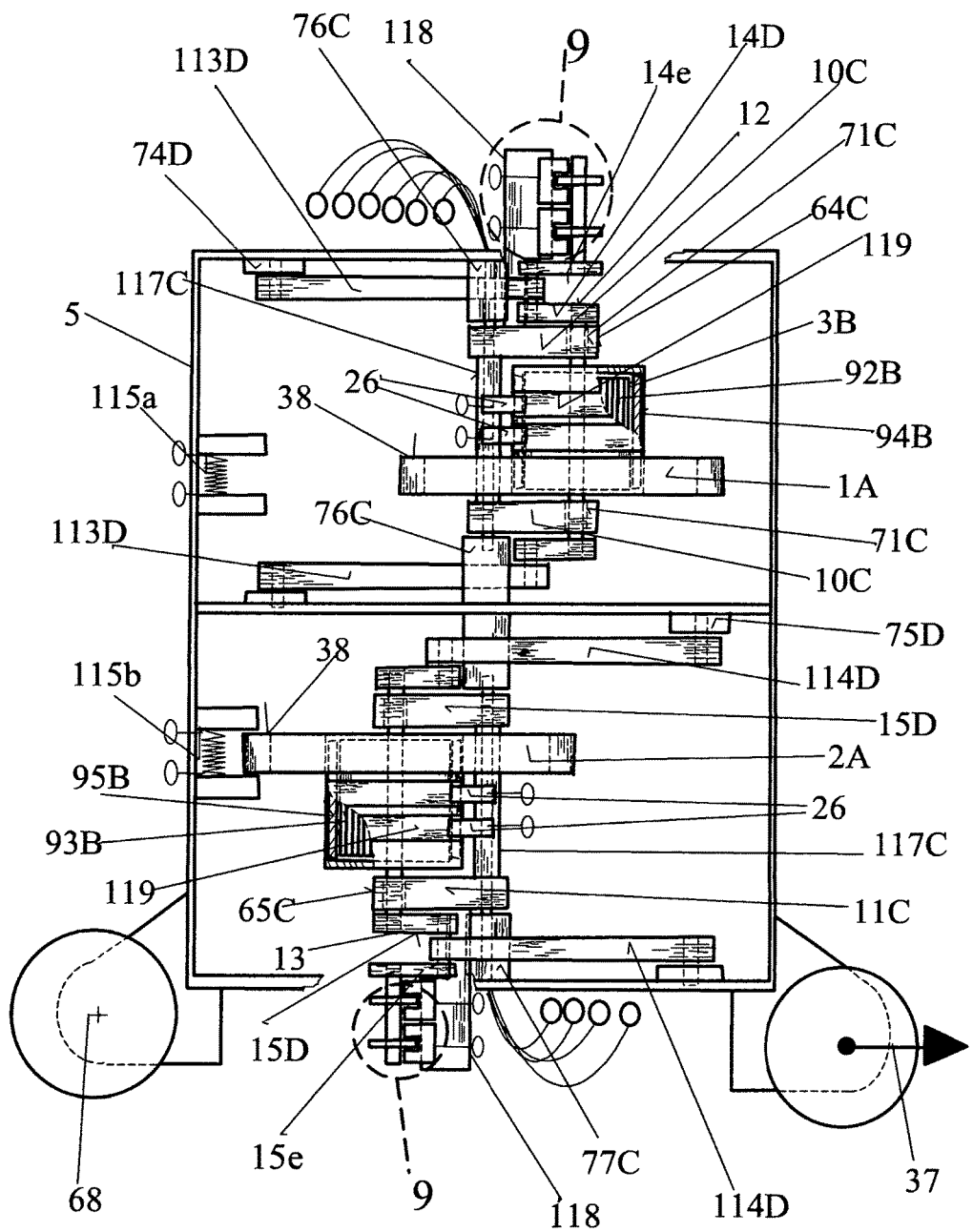
FIG. 2 is the side view of the propulsion device with symmetrical connecting rods for vertical angular guidance.
Figure 8:
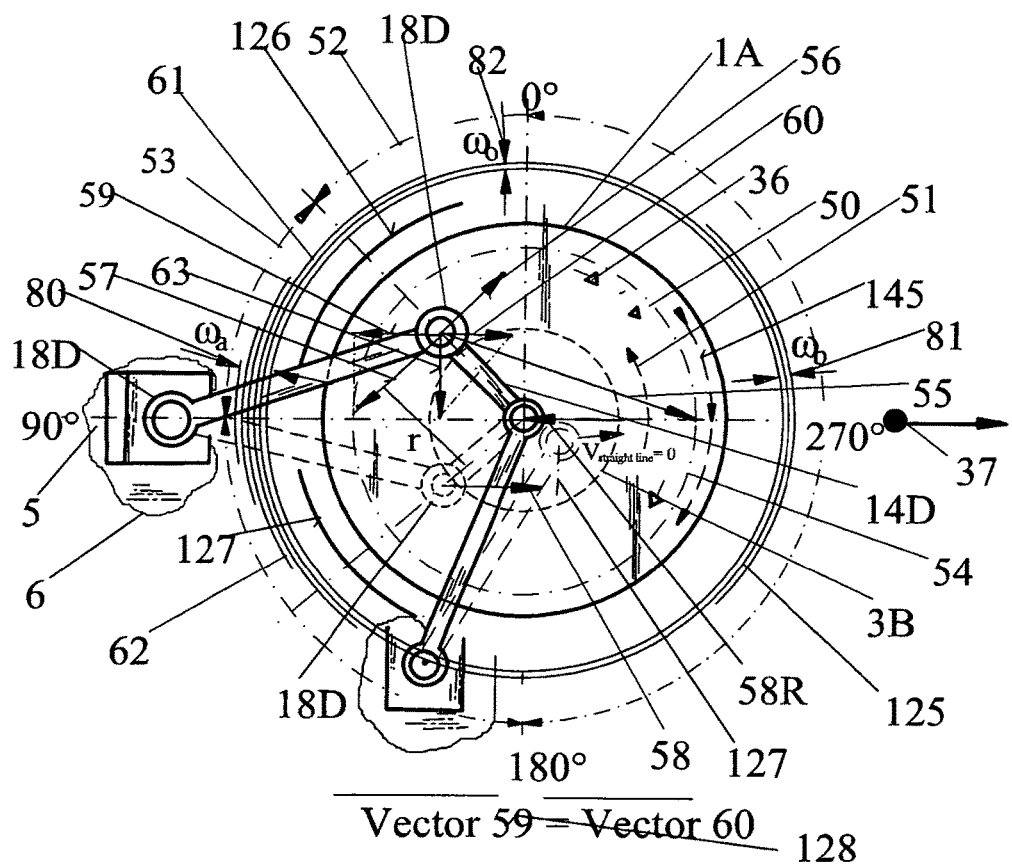
FIG. 8 is the top down view graphical representation of the force vectors, the accumulation and distribution of kinetic energy and the propulsion vector.
Figure 8A:
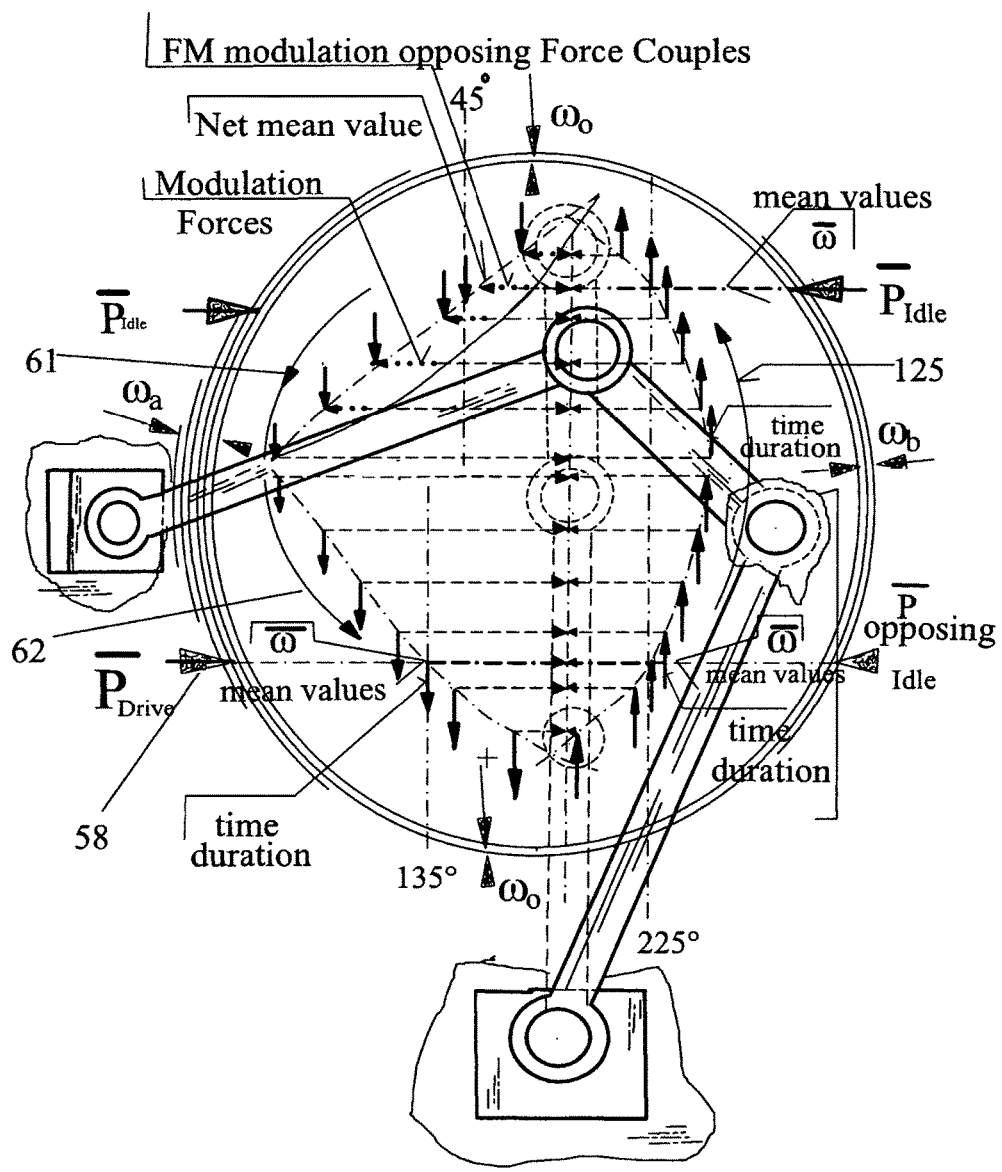
FIG. 8A is the internal self-contained force plot in relation to the angular motion and angular speed progressions.
Figure 8B:
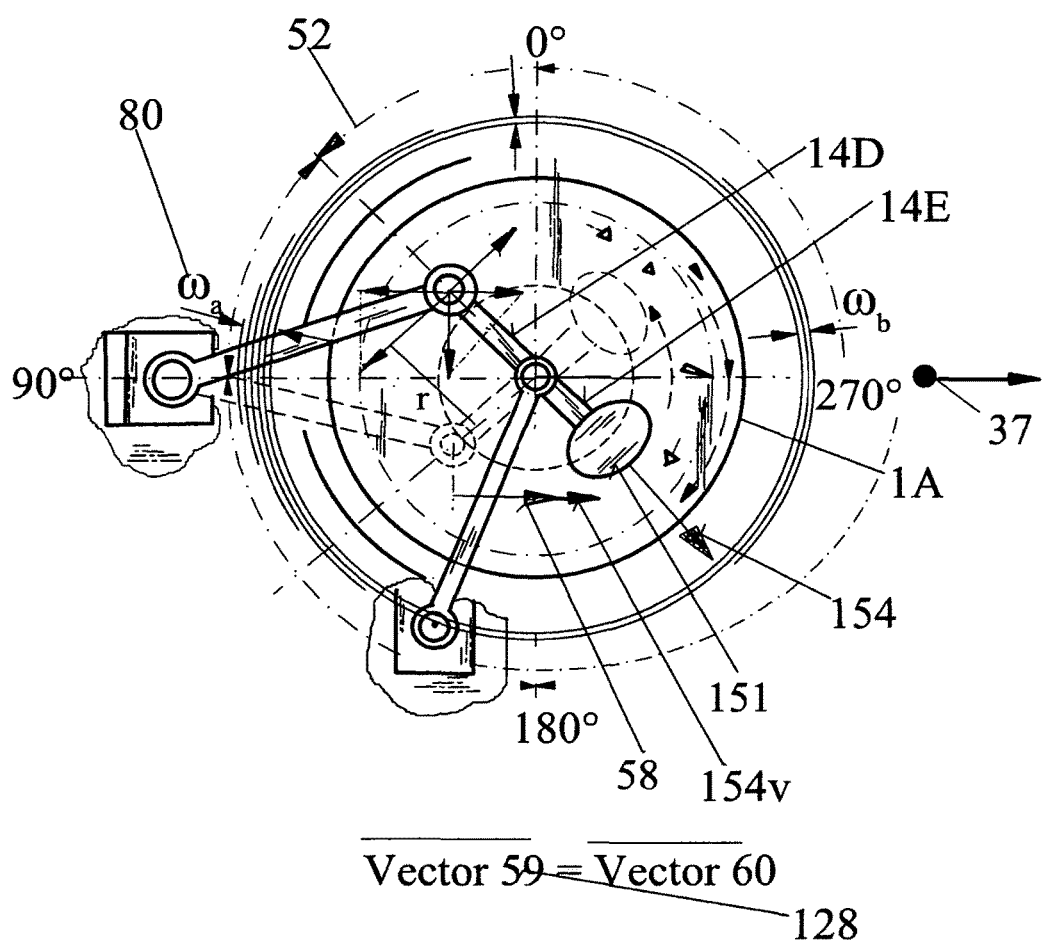
FIG. 8B is presenting the top down view of the propulsion device force vectors including the net centrifugal drive force.

Referring to FIG. 1J and also FIG. 2 and FIG. 10, depicting the centrifugal force 96 management and fine tuning capability of the radius bar extension 14E, 15E for mounting the removable centrifugal balancing weight mass 96, 151,152, this is balancing the centrifugal force 96, 153 of the radius bar 14D, 15D mass and the connecting rod 113D mass for furthermore providing a net centrifugal force 96, 154 generating an additional vehicular motivating drive component further presented in FIG. 8B.

Referring to FIG. 2, which depicts the side view of the propulsion device within the complete supporting frame. The side view of the propulsion device reveals the flywheels 1A and 2A in a rotor 45° progression to straight-line stroke position, it reveals the guidance swing arms 10C and 11C, the disk slotted interrupter 30a,30b, 31a, 31b with the associated slotted optical flag sensors 23a,23b, 24a,24b.

Figure 2A:
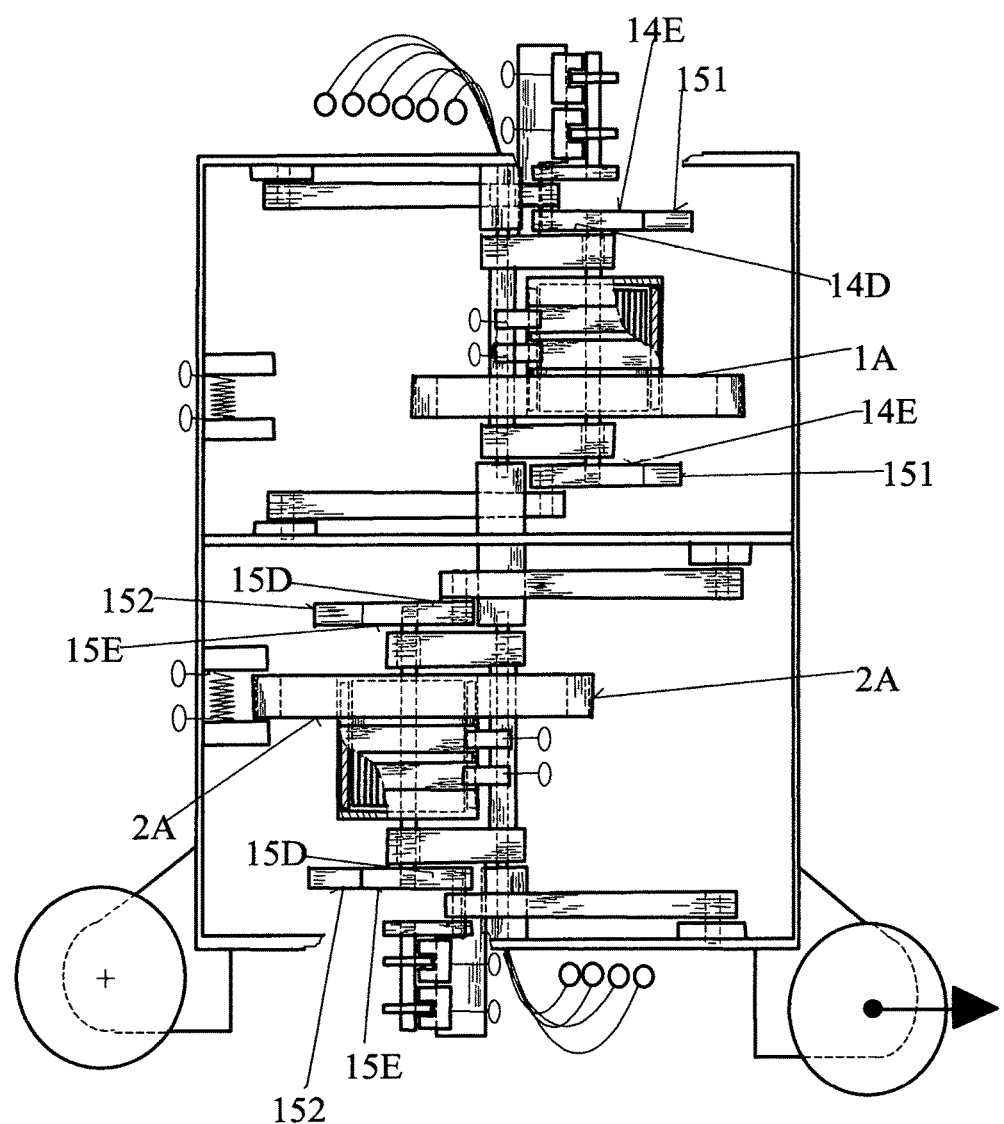
FIG. 2A is the side view of the propulsion device depicting the radius bar extensions for mounting the balance weights managing the centrifugal forces with a net gain in propulsion thrust.

Referring to FIG. 2A and also FIG. 1J, FIG. 10, FIG. 11A depicting the radius bar extensions 14E,15E for mounting the balance weights 151,152 managing the centrifugal forces 96, 154 with a net gain in propulsion thrust 96, 150,154.

Referring to FIG. 1, FIG. 1A-FIG. 1G and FIG. 2 the swing-arms pairs 10C,11C have a wrist-end straight-line movable member 64C and 65C. The swing-arms have a socket end 85C,86C and pivot at the socket-end within the fixed member pivot block 76C,77C. The flywheels 1A and 2A are rotatably contained onto the wrist-end movable member 64C and 65C by rotational bearing 71C,72C. The flywheels 1A and 2A with integral magnet housing 94B,95B rotate around the central shaft 12 and 13, by means of rotational bearings 69 and 70, while the integral motor-generator rotor 3B,4B is firmly secured co-centrically onto the central shafts 12 and 13. The central shaft is rotatably contained on the wrist-end movable member 64C,65C by means of the rotational bearing 71C, 72C. Each flywheel assembly AB-group further comprises a rotational-to-reciprocating transmission means D-group comprising members 14D,15D, 16D, 17D,18D,19D, 74D, 75D, 113D 114D for motivating each flywheel assembly in individual reciprocating straight-line motion motions. The minimum functional members of a rotational-to-reciprocating transmission is a rotational input and a reciprocating output, however, because the central shaft is driven by a regenerative drive supplying power as well as receiving power. Accordingly, each input and output member of the rotational-to-reciprocating transmission must be considered an input/output. The flywheel assembly straight-line reciprocating 37,37b inertial mass motions, for every 360° rotation of the motor-generator rotor, consists of two kinetic energy distributing 111,129 starting motions 78A sections and two kinetic energy conserving 103,128 stopping motions 78B sections, wherein the straight-line velocity for the passage from starting to stopping motion is proportional to the regular repeating rotor angular speed parameter; this is fully explained in FIG. 3 to FIG. 8, The motivating force of each flywheel assembly straight-line motion section is a sinusoidal projection of the centripetal force having its root cause from the rotor rotational energy content. Accordingly, the centripetal force and angular rotor kinetic energy are in a proportional relationship. Hence, the centripetal force is equal to the squared tangential rotor velocity 52 divided by the effective radius bar 14D, 15D length 96,116; consequently, each individual flywheel assembly straight-line starting inertial mass motion section is motivated by the rotor kinetic energy having its own individual effective force magnitude depending on the initial rotational potential kinetic energy magnitudes 105 of the rotor and further depends on the disposition of the rotational kinetic energy of the rotor during the flywheel assembly straight-line starting motion. In contrast, the initial straight-line kinetic potential energy 106 of the flywheel assembly is determining the effective force magnitude 102 for each stopping motion. This is because of kinetic energy conservation which makes the effective force magnitude of the straight-line stopping motion independent of any new kinetic energy introduced into the straight-line to rotational coupled motions stopping motion. In contrast, the net propulsion thrust magnitude is directly proportional to the average angular speed 107 of the motor-generator rotor during the flywheel assembly starting motion, the higher the average rotor angular speed performing the starting motion, the higher the propulsion thrust, up to a maximum of 33% angular speed gradient of the peak angular rotor speed. While the thrust magnitude is directly proportional to the average angular rotor speed amplitude for each starting motion length, in contrast, the effective average force magnitude of each starting motion length is directly proportional to the kinetic energy feed magnitude. When kinetic energy is removed during the starting motion by energizing the motor-generator rotor with a negative drive pulse, then there is a mutual reciprocal torque between the rotor and the flywheel slowing the angular speed of the rotor, mutually and reciprocally slowing the flywheel rotation and slowing the rate of the straight-line starting motion of the flywheel assembly. In contrast, when new energy is induced during the stopping motion part it will not change the effective thrust magnitude of the stopping motion because all straight-line motion energy of the flywheel assembly is continually conserved 103,128 into the rotation of the motor-generator rotor. These principles will be fully explained with vectors in FIG. 8. To accomplish the reciprocating flywheel assembly straight-line motion with the present technology, the rotational-to-reciprocating transmissions is comprising a radius bar members 14D and 15D secured eccentrically onto each central shaft 12,13. The eccentric end of the radius bar members have the crank pins 16D and 17D secured in a radius length from the central shaft, thereby, the crank pins are performing an orbital motion 52,52b around the central shaft 12,13. The crank pins 16D and 17D are rotatably contained in the straight-line thrust connecting rods 113D, 114D within the perpendicular oscillating end 147 for transferring the rotational motion of the crank pins into a straight-line thrust into the direction of the vehicular travel direction 37. The connecting rods have a thrust end 18D,19D and a perpendicular oscillating end in respect to the travel direction. The straight-line connecting rod thrust end 18D,19D are pivotally retained in the thrust receiver 74D, 75D mounted onto the supporting frame 5, in a horizontal line with the flywheels axis and in line with the travel direction; thereby providing the crank pins with angular freedom of motion and perpendicular guidance in relation to the vehicular travel direction. Thereby, because the crank pins having an orbital motion 52,52b around the central shafts, each central shaft and the flywheel assembly mounted upon it performs a reciprocating motion having a total displacement 116 of double the effective radius bar 14D,15D length. The radius bar extension 14e,15e first end is mounted onto the crank pin and the second end has the central shaft extension 12e,13e mounted upon it allows the vertical motion of the connecting rod and the extension of the central shaft for sensor mounting. The central shafts 12,13 are rotatably driven by alternating power drive pulses driving the regenerative motor-generator rotor 3B,4B having input as well as output power, therefore considering the operational aspects of the device, the central shaft 12,13 which is secured to the radius bar members 14D, 15D represent a rotational input/output member. The movable member 64C,65C together with the flywheel assembly 1A,2A represents a reciprocating member and the crank pins 16D,17D together with the connecting rods thrust ends 18D,19D pushing against the thrust receiver 74D,75D, is representing the kinetic energy output path into the vehicle 68. The summing points of motivating kinetic propulsion energy and contrary kinetic energy occurs in the connecting rods thrust ends 18D,19D working against the thrust receiver 74D,75D surface. It is important that there is a single measurable kinetic energy summing point and energy entrance point into the vehicle for verifications of the operational performance. The kinetic energy output path of each rotational-to-reciprocating transmission means pushes against the vehicle 68 through the connecting rod thrust end 18D and 19D and against the thrust receiver 74D,75D surface. The push force is a proportional reflection of the simultaneous combined straight-line and rotational flywheel assembly progressively changing non-uniform energetic inertial mass motions displacement 36,116, 78A,78B and is accordingly the entrance points of the propulsion energy into the vehicle. Many technologies are available to motivate the flywheel assemblies reciprocally from a rotational input, the present invention is not limited to the one particular motion technology presented; for example, rotational cams and cam followers provide rotational to straight-line motions transmission. The rotational position and angular speed of the flywheels 1A and 2A, are emitted by the encoder 28 and 29. The rotational position and angular speed of the motor-generator rotors is emitted by the slotted interrupter disc 30a, 20b and 31a and 31b interrupting the optical flag sensor 23a,23b,24a,24b. The drive pressure exerted by the connecting rods thrust ends 18D and 19D, is emitted by the load sensors 32, 33; wherein the net thrust is typically examined with a dual trace scope in differential display between sensor 32,33. The directional arrow 36, indicates the continuous rotational direction of the flywheels, which is indicated in clockwise direction but can be in counter-clockwise direction, which then reverses all other directions including the propulsion direction. The directional arrow 37, indicates direction of vehicular travel. An additional method for removing kinetic energy from the flywheels 1A,2A are the imbedded permanent magnets 38, imbedded in the walls of the each flywheel 1A and 2A, they are used for inducing electrical energy into the pick-up coils 115a, 115b for absorbing excess rotational and straight-line kinetic energy from the flywheels 1A and 2A. The action of the imbedded permanent magnets 38, acting mutually and reciprocally between flywheels 1A, 2A against the frame at the low speed end of the straight-line motion stopping 78B and starting 78A, 145 during the idle phase 125; thereby, their actions have no negative influence on the output thrust drive and returns excess kinetic energy of the flywheels 1A and 2A, back to the power-supply 22P.

Referring now to FIG. 3, FIG. 8, FIG. 9 and FIG. 10 which depicts the graph of the typical motor-generator alternating energy drive pulses A and B and the underlying principles in relation to the angular motion 52 of the rotor 3B depicted in FIG. 1, wherein the graphic height of the pulses are the power supply selected voltage potentials and the angular progression 0° to 360° is the displacement of angular motion. The graph depicts the pulse width modulation 120,121,142 of the alternating energy drive pulses for the motor-generator rotor 3B generated by the logic controller to subsequently accomplish an optimum potential energy work output thrust. The motor-generator rotor positive drive pulses A typically start at 20° and end at 90°, which drives and accelerates the flywheel 1A in the clockwise direction and simultaneously mutually and reciprocally 111 drives the motor-generator rotor 3B in the counter-clockwise direction; this is applying the principle of kinetic energy distribution of mutually separating masses depicted in FIG. 10, item 109 to 111, accordingly inducing rotational kinetic energy 103,104,105, 128 into the rotor. In reference to FIG. 1, the position of the motor-generator rotor 3B indicated by the radius bar member 14D is shown at 45°, while 0° is at the position of the radius bar member 14D at 12 o=clock position. At 0° is the start of the flywheel assembly straight-line stopping motion 78B in direction of vehicular motion 37. During the angular acceleration of the motor-generator rotor 3B, while passing from 20° to 90°, accumulates rotational kinetic energy 103, 105 into the motor-generator rotor 3B. The accumulated kinetic energy is subsequently used for energising the propulsion thrust; the action of torque for every angular displacement section, according to the derivation of the pendulum, must be called a kinetic energy accumulation phase.

Figure 4:
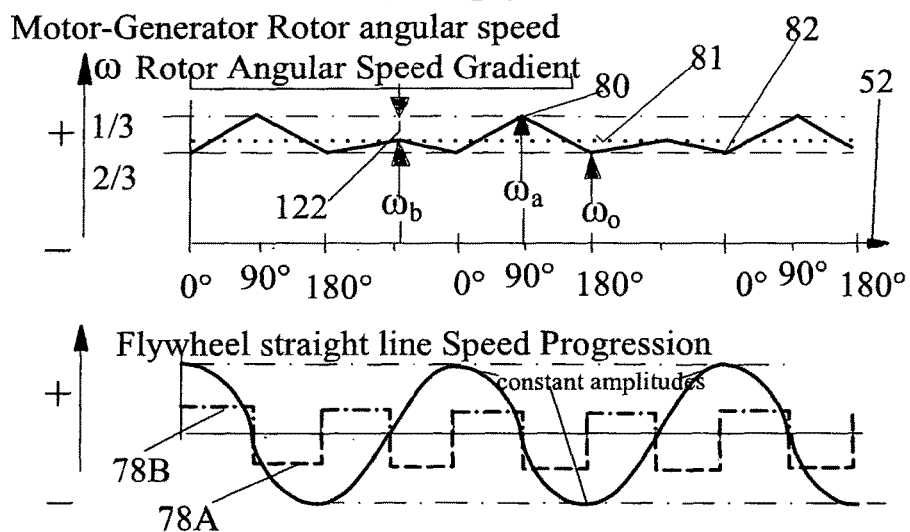
FIG. 4 is the graphical representation of the motor-generator rotor angular speed progression in relation to the straight-line velocity progression.
Figure 9:
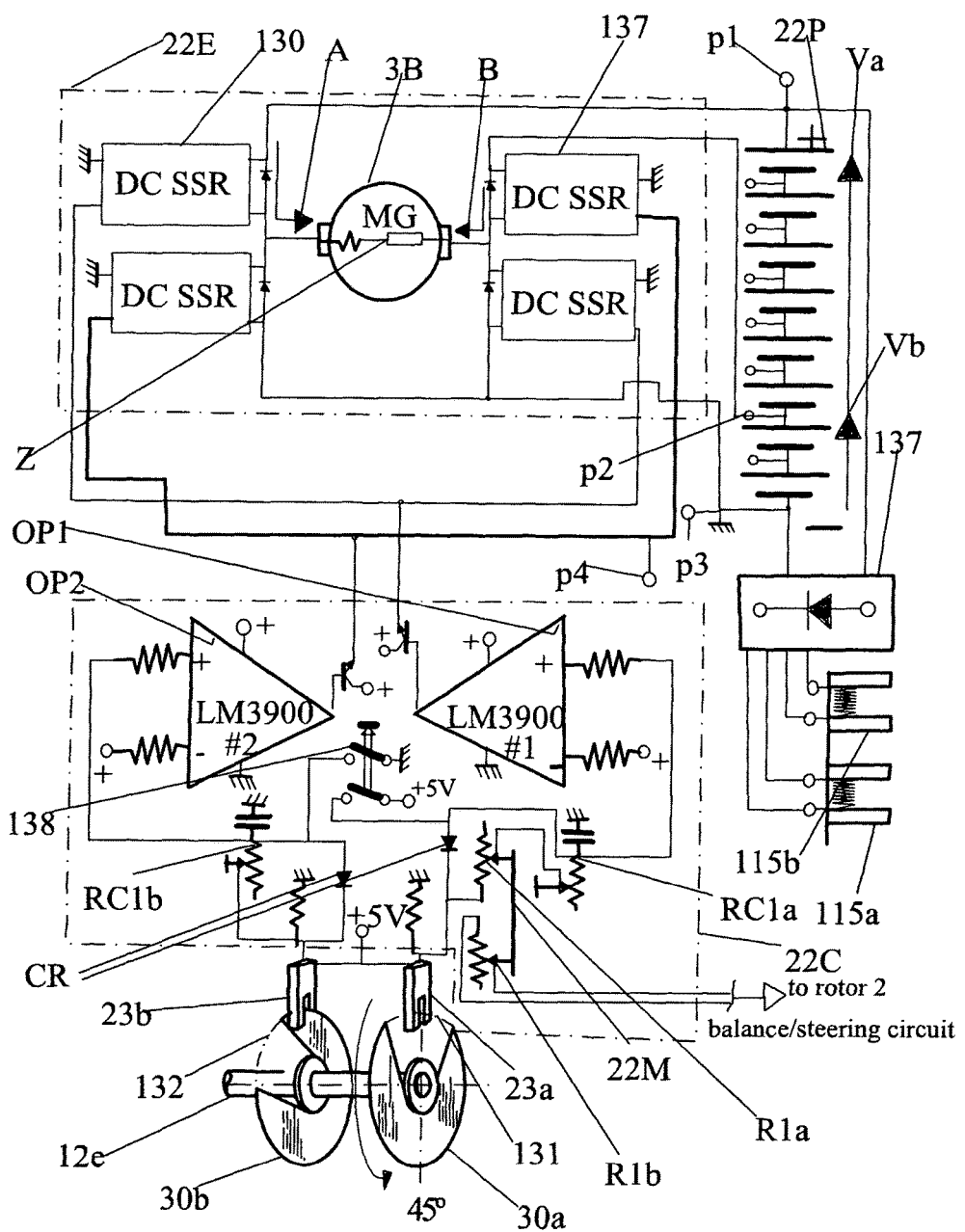
FIG. 9, FIG. 9B is the graphical presentation of the power supply, motor-generator electrical control logical control function.

Referring to FIG. 4, FIG. 4B and also FIG. 8B, FIG. 9 which depicts the motor-generator rotor 3B typical angular speed progression in relation to the rotor angular rotation position. FIG. 9 depicts the controls for the alternating drive pulse A, B generation. At the end of the accumulation phase past 90°, the motor-generator rotor has the peak rotational kinetic energy potential $\omega_a$, 80, 105 within the total propulsion cycle duration of 360° having regular repeating energy potentials 80 and is the beginning of the flywheel assembly starting motion 78A in opposite direction of vehicular travel 37b. The propulsion thrust phase is accomplished by the angular de-acceleration of flywheel 1A,103 and the simultaneous mutual and reciprocal 111 de-acceleration of the motor-generator rotor 3B,103 creating an additional angular speed gradient 122 (80 minus 81) in the rotor. The propulsion thrust phase drives the motor-generator with a negative drive pulse B which is quantity selected by the manual potentiometer capacitor network RC2. The propulsion thrust phase occurs between 90°-190°, which accelerates the straight-line inertia of the flywheels assemblies opposite of vehicular travel direction 37b employing the peak initial rotor kinetic energy potential $\omega_a$, 80,105 present at 90°. The Thrust phase is the first starting motion 78A of the propulsion cycle. The thrust phase is driving the vehicle forward in a simultaneous mutual and reciprocal mass motion separation between the flywheel assembly straight-line inertial mass 106 and the vehicle inertial mass, distributing the accumulated rotor kinetic energy 103,129 (80 angular speed magnitude minus 81 angular speed magnitude) between the vehicle and the flywheel assembly according to the reverse ratio of the separating inertial masses 111; thereby inducing a kinetic energy gain 148 into the device, The drive-phase effectively converts and depletes the peak rotational kinetic energy $\omega_a$, 105, 80 of the motor-generator rotor into straight-line kinetic energy 106 of the vehicle 68. During a stall condition the drive phase also restores any unused kinetic energy back into the power-supply if the manual control RC2 is set to a pre-determined stall position. At the end of the drive phase, past 180°, the kinetic energy potential of the rotor is nearly identical to the rotor energy potential at 0°, accordingly, the additional kinetic energy accumulated by the accumulation phase is locked into the mass motion of the propulsion device. The motor-generator negative drive phase B power is always set to a lower intensity than the positive power accumulation phase because of frictional losses, sufficient kinetic energy must remain in the motor-generator rotor 3B, to complete the rotational cycle at the regular repeating angular speed 81 parameter set into the RC1b potentiometer. The completion of the propulsion cycle is represented by passing the 90° to 180° to 0° rotor angular progression. The difference between the accumulation phase drive power 61,80,105,A,120 and the propulsion phase negative drive power 62,81,105,B,121 minus any internal mechanical frictional losses 112,112b is accordingly the kinetic energy invested into the motion of the device 108, 148.

Referring to FIG. 4B wherein the rotor 3B angular speed progression of a continues idle phase 125 within the angular rotor displacement progression from 0° to 360° in comparison to the straight-line speed progression of the flywheel assembly is depicted. The regular repeating rotor angular speed 81 and the lowest rotor angular 82 occur uniformly at 90° in direction of intended vehicular motion 37 and at 270° opposite 37b of intended vehicular motion resulting in a zero propulsion thrust because the angular rotor speed 81 minus lowest angular rotor speed 82 occur twice reciprocally negating any thrust; then the vehicle is performing no idle kinetic energy gain 148.

Figure 3:
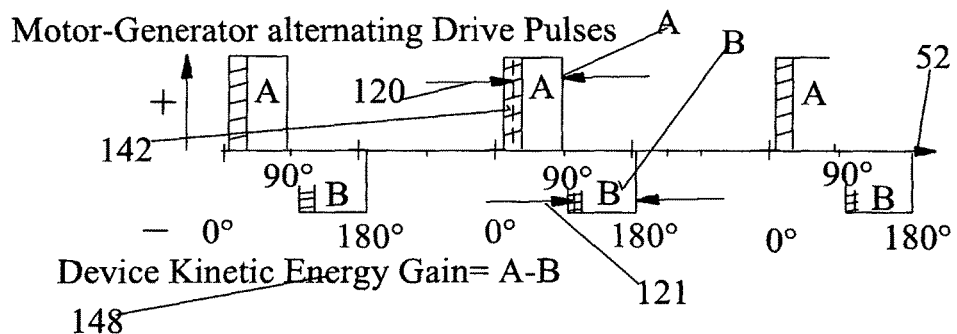
FIG. 3 is the graphical representation of the motor-generator drive pulses generated by the logic control.
Figure 5:
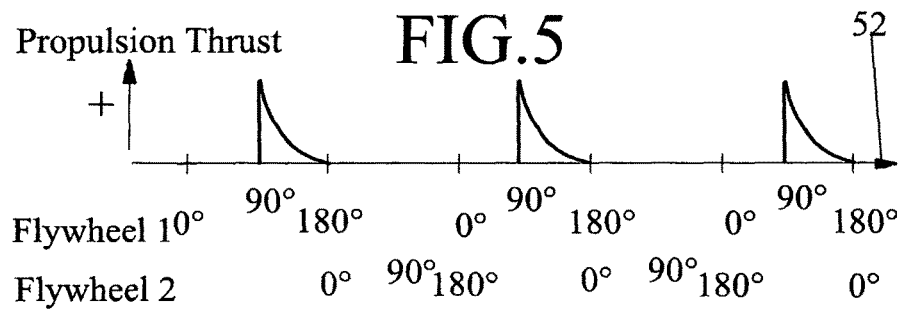
FIG. 5 is the graphical representation of the resultant potential energy work output thrust pulses.

Referring now to FIG. 5 and also FIG. 3, which depicts a graph of the typical resulting potential energy work output thrust drive generated by the pairs of flywheels 1A and 2A. The output thrust drive starts to develop from the inertia elements during the propulsion thrust phase past 90° rotor rotation. The propulsion thrust phase effectively combines the liner inertial reluctance of the flywheel assembly with the accumulated rotational kinetic energy of the motor-generator rotor 99 and invest the combined kinetic energy into the forward motion of the vehicle (68). The angular speed gradient 122 is the peak angular speed 80 at 90° minus the regular repeating angular speed 81 at 270°. The maximum ratio between the peak angular speed 80 and the lowest angular speed 82 should be a ratio smaller than 1 to ⅔ or less than 1.5 decimal, any greater ratio is an effort of diminishing returns; this principle will be, further explained with FIG. 11. The manual controller settings are keeping the speed gradient 122 (80 minus 81) constant by applying sufficient negative power drive pulses, thereby keeping the propulsion thrust constant under changing gravitational load conditions. The difference between the regular repeating angular speed 81 and the lowest angular speed 82 is inversely proportional to the mass moment of inertia of the rotor. Accordingly, the higher the mass moment of inertia of the rotor the lower the difference between 81 and 82. Furthermore, the higher the selected regular repeating angular speed parameter 81 the higher is the propulsion thrust in a proportional progression. Then, solving effective potential energy work output thrust in regards to rotor angular speed. The effective average (mean value) propulsion thrust 108 developed between 90° and 190° is equal to ½ the flywheel assembly straight-line motion 106 inertial mass times the radius bar 14D effective orbital radius times the rotor angular speed gradient. (magnitude of 80 minus magnitude of 81) 103,106. Furthermore, when considering frictional losses from rotor rotation 180° to 0°, friction is reducing the effective propulsion thrust and must be subtracted from the rotor angular speed gradient. The angular speed magnitude of 80 minus magnitude of 81 minus the loss of angular rotor speed due to friction 112 and damping 112b is the true effective angular speed gradient performing the propulsion thrust for the 0° to 360° propulsion cycle; wherein the drag torque "$\tau_{drag}$" constant and the dampening constant "c" are supplied by the motor-generator manufacturer specification sheets.

Referring to FIG. 6 and FIG. 7 which depicts the Flywheel A1 and A2 straight-line speed slope non-uniform contour progression 123 in correlation to the angular motion progression, in 90° steps; indicating the starting 78A and stopping 78B type motion. It clarifies the peak straight-line speed 126 to the transient stopped state 127 to the accumulation phase 61, the drive phase 62 and idle phase 125. FIG. 7 depicts the net thrust impulses calculated 98 using the speed contours for every angular displacement position using the force per angular position principle 98. It clarifies the correlation of flywheel 1A,2A assembly motion direction 37,37b to the periodic alignment of the flywheel 1A assembly 180° angular position with the flywheel A2 assembly 0° angular position.

Referring now to FIG. 8, FIG. 8A and back to FIG. 6 which depicts the vector parameters in correlation to the cyclic angular rotation progression 0°-360° of the motor-generator rotor 3B. The directional arrow 50, indicates the angular acceleration of the flywheel 1A. The directional arrow 36, indicates the continuous rotational direction of the flywheel, which is in a clockwise direction. The directional arrow 51, indicates the de-acceleration direction of the flywheel. The rotational direction 52, indicates the rotation of the motor-generator rotor 3B. The vector angle 53, between the position of the radius bar member 14D and the right angle of the connecting rod thrust end 18D, determines the instantaneous acceleration/de-acceleration characteristic of the flywheel assembly straight-line motion 106 inertia, following a progressive changing no-uniform sinusoidal motion 123. The centre line of mass moment of inertia is indicated with dashed circle 54. The vector triangle 55, is the instantaneous representation of the vector thrust drive, for the indicated vector angle 53. The motor-generator rotor torque, pushing against the reluctance of the flywheel rotational inertia, generates the reciprocal tangential thrust drive vector couples 56 and 57 using the principle of mutual and reciprocal separation 111 between the flywheel moment of inertia and the rotor moment of inertia, wherein tangential force vector 57 is being applied onto the crank pin 16D and force vector 56 is applied onto flywheel. The thrust drive vector 58, is the main driving thrust for the inertial propulsion device during the drive phase 62. The tangential vector 57, generated between 20-90° is the main source of kinetic energy for the self-contained inertial propulsion device and is without interference to any other motions because its energy is generated mutual reciprocal 111 between the motor generator rotor and the flywheel. The kinetic energy is accumulated from 20°-90° in the motor generator rotors rotational inertia and is called the kinetic energy accumulation phase 61. The accumulated kinetic energy 103,105 is then released during the kinetic energy drive phase 62,129, approximately from 90-180°. The accumulated kinetic energy is used to accelerate the straight-line motion inertia of the flywheel assemblies, in opposite direction of vehicular travel, accordingly investing net straight-line motion kinetic energy into the vehicle in direction of vehicular travel 37 by applying force vector 58 against kinetic energy thrust receiver 74D,75D surface, driving the vehicle simultaneously mutually and reciprocally forward according the kinetic energy distribution of mutually separating masses 111,129; accordingly inducing a kinetic energy gain 148 into the device. The excess rotational kinetic energy induced into the flywheel 1A, 1B during these reciprocal actions is then absorbed during the idle phase 125 by the permanent magnets acting onto the pick-up coils, between approximately 250° to 290° 145, preventing a loss of forward drive for the reversal of alternating motion. This method of self-contained inertial propulsion depicted in FIG. 8, therefore becomes apparent, because the thrust drive vectors 59 and 60 are opposing, neutralising the main source moment of thrust drive tangential vector 57, for any reaction drive thrust opposite of the vehicular travel direction; the thrust drive vector 57 is, at the same time, inducing rotational kinetic energy into the motor-generator rotor at an ever increasing rate, causing the kinetic energy accumulation phase 61,128. The reason that the main source moment of potential energy work output thrust drive is not acting as an opposing thrust to vehicular travel, is the increasing straight-line motion de-acceleration rate of the flywheel assemblies straight-line motion inertia, up to the reversal 127 of the flywheel assemblies straight-line motion sinusoidal movement at 90°. The de-acceleration represented by thrust drive triangle 55, generates thrust drive vector 63, which generates thrust drive vector 60, which opposes thrust drive vector 59. During the accumulation phase, the progressive increasing straight-line de-acceleration of the flywheel assembly=s straight-line motion inertia acts as a governing influence, returning any increase in straight-line kinetic energy instantaneously back into the rotational energy of the motor-generator rotor, which represents a governing negative feedback loop 128, 129, 62. Accordingly, the present invention generates self-contained impulses.

Referring to FIG. 8A and also back to FIG. 8 depicting the relative force magnitude and the time duration magnitudes for each 18° angular section progression of the 360° rotor 3B propulsion cycle having an angular speed $\omega_a$=140 and $\omega_b$=100. The force vectors are in horizontal direction and the time duration vectors are pointing vertical in direction of the radius bar rotation 52 forming a graphical impulse area. The force vectors and time durations are calculated using a radius bar length of 1 cm, flywheel assembly mass of 1 kg calculated with formula 97, 98, 101. The FIG. 8A relative graphical force and time vector length is in a 1:3 length relation to the graphical length in FIG. 11 for fitting the whole 360° cycle onto one page.

Referring to FIG. 8B and also back to FIG. 3, FIG. 8, FIG. 8A; presenting the top down view graphical representation of the propulsion force vectors including the centrifugal force 96 management weight 151 mass vector 154 and including an additional centrifugal vehicular propulsion drive force 154v. The peak angular speed $\omega_a$ 80 is causing the management weight to exert an additional force 58+154v between angular position 45°-135°; this is causing an additional self-contained vehicular propulsion impulse 150.

Referring to FIG. 9 also FIG. 1, FIG. 2, FIG. 3, FIG. 8 which depicts the power supply 22P, the solid-state H-bridge DC power relay alternating power drive pulse drivers 22E, the controller circuit diagram 22C and the slotted optical flag sensor 23a, 23b mounted onto the bracket 118 attached to the swing arm 10C,11C, with their corresponding slotted interrupter disc 30a. 30b mounted onto the central shafts 12e,13e extensions. FIG. 9 is a detailed representation of the motion controller and power switches operating the motor-generators electrical current conducting conductors 92B, 93B. The control circuit is depicted at 45° rotor 3B rotation performing the accumulation phase 61 drive pulse A. At start of the control slot 131 operated by the CCW rotation of the shaft 12 activating the slotted optical flag sensor 23a, when the resistor capacitor delay circuit RC1a through the rotor 3B,4B balance adjuster R1a,R1b is being time delayed 142 charged up to the point of satisfying the op-amp op1 energising the motor generator rotor 3B with a positive drive pulse A through DC SSR relays 136. The charging delay 142 is delaying the onset of the positive drive pulse A. The RC1a potentiometer is a dual stacked potentiometer providing an identical drive pulse A RC delay setting for both rotor 3B and rotor 4B controller section for one potentiometer shaft setting; wherein the RC1a potentiometer stack must be viewed as a gas petal control. The balance adjuster R1a,R1b is a tandem potentiometer wired in mutual opposite orientation, when R1a increases the resistance for the 3B rotor controller circuit, the other R1b decreases the resistance for the other rotor 4B controller circuit; the R1a,R1b potentiometer stack must be viewed as the steering control of the controller. The RC network components are typically a 1 µF capacitor in series with a 50 kΩ Pot. resistor. At the end of the control slot 131 motion the slotted optical flag sensor 23a will turn off fast discharging the RC1a delay circuit through the discharge diode CR rapidly dissatisfying the op-amp op1 thereby providing a manually controlled angular pulse width 120 positive drive pulse A. The positive drive pulse A consists of a drive current magnitude driven by the selected voltage potential $V_a$ into the current carrying conductors within the rotor and magnet housing having a complex circuit impedance Z; accordingly, is the well-known motor-generator performing work over the angular pulse A displacement distance inducing the kinetic energy accumulation phase 61. The complex circuit impedance is specified by the motor-generator and power supply specification sheets. Further angular rotation progression 52 of the shaft 12 will activate the control slot 132 activating the slotted optical flag sensor 23b charging the RC1b delay circuit satisfying the operational amplifier Op2 energising the motor generator rotor 3B with a negative angular drive pulse B through DC SSR relays 136, thereby providing a timed manually controlled pulse width 121 modulated negative drive pulse B for energising the drive phase 62. The negative drive pulse B consists of a negative drive current magnitude driven by the selected voltage potential $V_b$ into the current carrying conductors circuit over the angular displacement distance 121 having a complex impedance Z; accordingly, performing negative work over the angular pulse B displacement driving the drive phase 62. The circuit impedance is specified by the motor-generator and power supply specification sheets. The R1a, R1b control potentiometer is a stacked type dual pot wired in opposite orientation allowing the simultaneous increasing and decreasing of the accumulation phase kinetic energy applied to the 3B, 4B rotors; this allows the steering of the device. The potentiometer capacitor RC1a is effectively controlling the flywheel assembly straight-line speed amplitude in combination with the potentiometer capacitor RC1b, together they effectively are controlling the flywheel straight-line motion complex speed progression and the amount of kinetic induced into the device. The 22E DC solid state relays are typically crydom CMX series opto-isolated field effect power switches and the 22C control circuits are typically using current mirroring Norton OP amps LM3800N types. When the flywheel straight-line motion 116 nears the transient stop 127 of the alternating flywheel assembly motion, then the flywheel kinetic energy pick up coils 115a, 115b are becoming operationally engaged, during the idle phase 125, with the permanent magnets 38 between approximately 250° to 290° by proximity 145 with the permanent magnets 38 inducing electrical alternating cycle energy into the energy collectors further rectified by the bridge rectifiers 137 and causing a recharge current into the power supply. Accordingly, the angular Kinetic energy 36,105 induced into the flywheels 1A, 2A mutually and reciprocally 111 during the accumulation phase 61 is collected and recycled. A start switch 138 is provided for forcibly satisfying Op1, dissatisfying Op2 thereby starting the rotation of the rotor 3B,4B from the stopped position within the powerless idle phase 125.

Figure 9B:
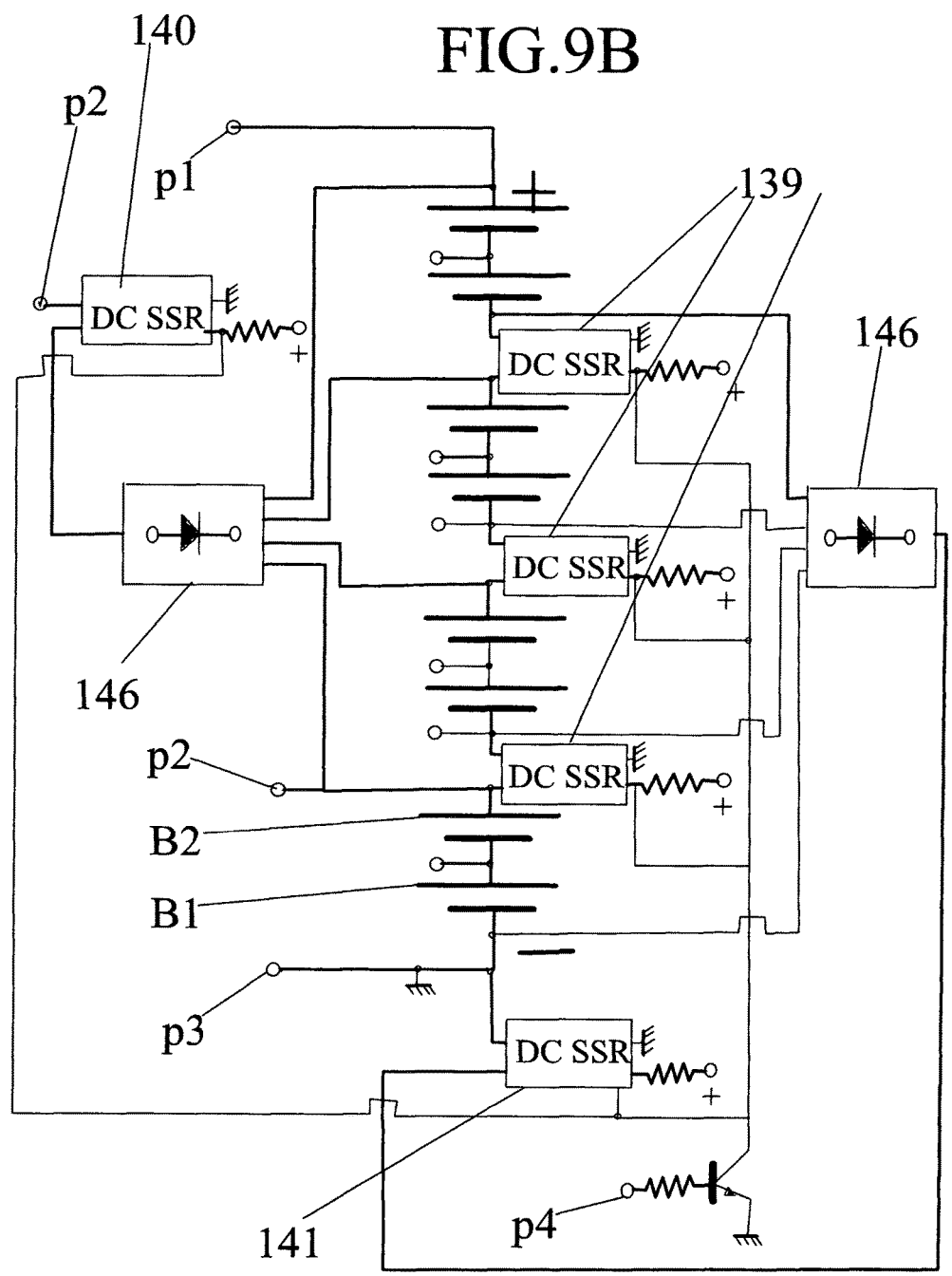

Referring to FIG. 9B and also back to FIG. 9; wherein FIG. 9B depicts the power supply alternate wiring for studying the energy scavenging for a true regenerative motor-generator operation. The power supply depicted in FIG. 9 is removed from plugs p1,p2,p3,p4 and the alternate power supply circuit from FIG. 9B is plugged in. Then, during the drive phase when op-amp OP2 is satisfied activation a reverse current drive pulse B through the H-bridge drives, it also activates P4 in FIG. 9B and activating the switching of the cells into parallel mode with DC SSR relays 139,140,141; thereby accepting a drive phase B regenerative charge current from the motor-generator, through the power rectifiers 146, back into the power supply.

Referring to FIG. 11 and also back to FIG. 8; FIG. 11 is depicting the force 98,102 progression plot in respect to the time durations of five 18° sections dividing the 90° drive phase 62, applying to the rotors 3B,4B having an initial peak 80 angular speed magnitudes $\omega_a$ of 100, 110, 120, 130 and 140 rad/sec respectively, depletingly being reduced by the drive phase 62, down to a magnitude 82 of 100 red/sec by mutual distribution of energies 111,129 between the device straight-line inertial mass, the impulse mechanisms 134,135 straight-line motion inertial mass starting motion 78B and the drive phase 62 energy withdrawal pulse B. The plot reveals that there is an individual sinusoidal force magnitude reflected for each 18° angular rotor motion section resulting in a net impulse area circumscribed by points ABE 143 minus impulse area circumscribed by points ACD 144 is the net impulse 150 p=ABE-ACD=0.20 Newton seconds. This FIG. 11 plot is validating the net self-contained impulse of formula 108. The curve progression 149 of each mean value force intersecting point with each 45° centreline represents a diminishing returns progression if the angular speed progression ratio $\omega_0/\omega_a$ exceeding 70%.

Referring to FIG. 11A and back to FIG. 8B, FIG. 10 depicting the force 58, 98,102 together with the centrifugal force 96, 154 progression plot in respect to the time durations of five 18° sections dividing the 90° drive phase 62, applying to the rotors 3B,4B having an initial peak 80 angular speed magnitudes $\omega_a$ of 100, 110, 120, 130 and 140 rad/sec respectively wherein the centrifugal force 154 is providing an additional vehicular drive component 98+154.

Figure 12:
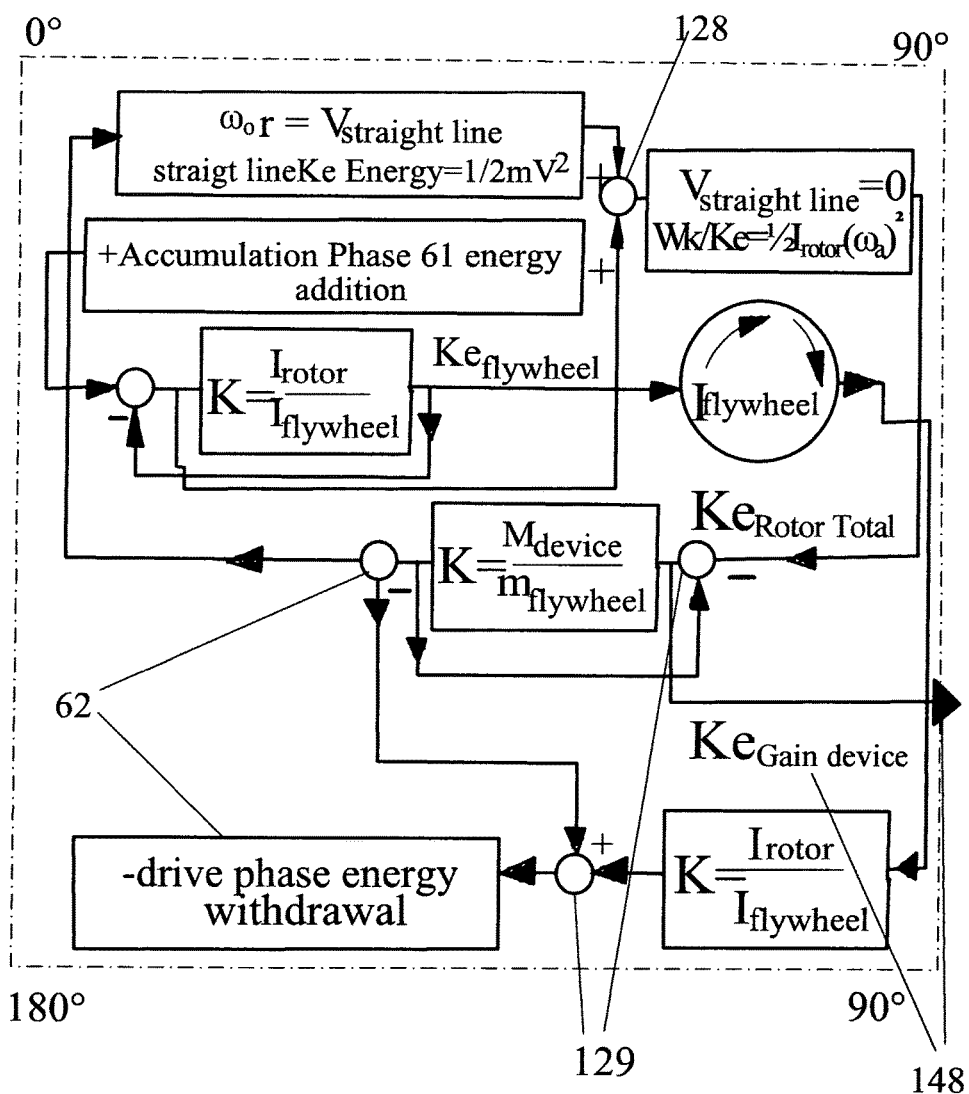
FIG. 12 is the control block diagram of the kinetic energy flow.

Referring to FIG. 12, wherein the feedback loop energy conserving function 128,111, the feedback energy distribution function 129,111 and the net propulsion Kinetic energy gain 148 is presented as a feedback control diagram. Here it becomes apparent that the kinetic energy conserving function is the reverse of the energy distribution function having simply a reversal of energy flow direction.

While I have shown and described a preferred embodiment in comparison of other less desirable embodiments of my invention, it will be apparent to those skilled in the art that many changes and modifications may be made without departing from my invention in its broader aspect. I therefore, intend the appended claims to cover all such changes and modifications as fall within the true spirit and scope of my invention.

I claim:

1. A device for efficient self-contained inertial vehicular propulsion comprising:

a frame (5) configured for having freedom of a vehicular (68) motion in a vehicular travel direction (37);

a first impulse assembly (A,B,C group,134) and a second impulse assembly (A,B,C group,135), each impulse assembly comprising an inertial body (106) and each comprising an inertial mass reluctance magnitude and each comprising a swing arm pair (10C,11C); each swing arm of the swing arm pair having a length and two ends, the first end has a swing arm socket-end (85C,86C) rigidly connected by a tie bar (117C), pivotally guided within a pivot block pair (76C, 77C) disposed into said frame having an annular guidance surface (87C,88C) for providing for the swing arm a pivotal freedom of alternating motion in orientation with said travel direction, the second end of each said swing arm pair comprising a movable member (64C,65C), each movable member within each said impulse assembly rotatably retaining a shaft (12,13) having two ends retained in parallel axial orientation relative to the other shaft and in perpendicular orientation to said travel direction by means of a bearing pair (71C,72C); each said shaft within each said impulse assembly further co-centrically rotatably retaining a flywheel (1A, 2A) having a large moment of inertia (104) in relation to the impulse assembly inertial mass operatively functioning as an inertial backrest, the flywheel co-centrically comprising a substantially imbedded motor-generator magnet housing (94B,95B); each said shaft rigidly contains a motor-generator rotor (3B,4B) configured in relation to said inertial backrest for a small moment of inertia (104,105) magnitude operatively comprising an inertial mass ratio relation 111, further comprising current carrying conductors (92B,93B) operating within said magnet housing having a complex circuit impedance (Z) for exerting a singular motor-generator internal mechanical torque (56,57,59,60,155, 129) between the rotor and mutual reciprocally (111) against said magnet housing within said inertial backrest accumulating a small backrest angular kinetic energy (36) magnitude inherently depending on the inertial mass ratio (111) relation opposingly accumulating a large (111) rotor angular kinetic energy (52,52b,105 and a shaft rotation progression (80,81,82,98); each said shaft has a rotational coupling (12e,13e,14e,15e) to a first set of (126,127) interrupter disk (30a,31a) and a second set of interrupter disk (30b,31b) having each an annular slot for interrupting slotted optical flag sensors (23a,24a, 23b,23b) mounted onto said swing arm for emitting one angular timed pulse (A) and one angular 90 degrees lagging timed pulse (B) for each shaft rotation cycle operatively charging a potentiometer capacitor delay circuit (142,RC1a,RC1b) through a balance adjuster potentiometer (R1b) operatively coupled to an op-amp (OP1,OP2) circuit for passing limed delay pulses to a H-bridge (22E) DC-solid state relays (136) power circuit, receiving power from a power supply (22p) voltage potential (Va,Vb), for switching an angular pulse width (120,121) tuned positive drive pulse (A,62) current magnitude into said current carrying conductor circuit (155) through a slip ring and flex cable for the pulsed accumulation of said rotor angular kinetic energy and for switching an angular pulse width (121,RC1b) tuned negative drive pulse (B,61) current magnitude into said current carrying conductor circuit (103,104,105,129,150) for the pulsed removal (62/121,129) of angular kinetic energy from said rotor for generating a cyclic repeating timed non-uniform angular motion progression (80,81,82,122,123); each rotor is rigidity coupled to a radius bar (14D,15D) having a crank pin secured (16D,17D) in parallel orientation with the shaft at an orbital radius distance from the shaft having an orbital motion (52,52b,80,81,82) for rotatably exerting against a connecting rod (113D,114D,147) having a length comprising a thrust end (18D,19D) pivotally containing a thrust receiver (74D,75D), the thrust receiver is mounted onto a load sensor (32,33) mounted onto said frame in an in-line orientation with said movable member and in-line with said travel direction for exerting (57,58, 60,62,98,150) against the frame and simultaneously reciprocally exerting (111,129) against said impulse assemblies' inertial reluctance for motivating the impulse assemblies into one starting (78A) motion following one stopping (78B) motion within each direction of an alternating cycle having each inherently a straight-line displacement length (116) of the radius bar and a straight line kinetic energy (80,96,106) magnitude comprising a stopping motion in orientation with said travel direction comprising said positive drive pulse (A,62,120) for accumulating additional rotor kinetic energy for exerting an additional concurrent opposing force vector (59,60, 111,102) between said trust receiver and said impulse assembly inertial mass reluctance having inherently a net zero force (128) effect for transferring (103,104, 105,106) the straight line kinetic energy of the impulse assembly stopping motion together with said kinetic energy of the positive drive pulse into additional rotational kinetic energy (101) of the rotor for accumulating a rotor peak angular kinetic energy (80,105) by the end of the stopping motion following cyclicly by said starting motion (62,78A,111,129) having an opposite motion direction (37b) to said vehicular travel direction for exerting inertially a resultant peak momentary force vector (58,80,98,104) and a resultant cyclic elevated average sinusoidal force vector (58,80,143) magnitude and a resultant (106,107) cyclically elevated average impulse magnitude (58,108,143,144) and a cyclically elevated centrifugal force (154) magnitude onto said thrust receiver for applying a resultant propulsion thrust (58,98,108) onto said frame for transferring the rotor peak kinetic energy into a straight line kinetic energy gain (37,122,148) of the device combined inertial mass reluctance and comprising said negative drive pulse for the further removal of the rotor, peak kinetic energy back reducing down to a lower idle cyclic rotor angular kinetic energy (81,82, 124,125) magnitude by the end of said opposing starting motion for retaining a self-contained propulsion thrust (108,143,150) magnitude and returning unused said rotor peak kinetic energy back into the power supply enabling an efficient inertial propulsion for the completion of said opposing motion cycle.

2. The device, as claimed in claim 1, further comprises a plurality of permanent magnets (38) imbedded into the walls of the flywheels for mutually and reciprocally (111) inducing a recharge current into an electro-mechanical pick-up coil (115a,115b) for depleting angular kinetic energy (36) from said flywheels and chargingly efficiently restoring the energy back into said power supply.

3. The device, as claimed in claim 1, further comprises regenerative power supply cells (B1,B2) for the efficient recovery of said motor-generator rotor angular kinetic energy amplitude (80,62,128,129) comprising DC solid state relays (139,140,141) configured for switching the supply cells (B1,B2) into parallel mode for chargingly accepting said negative drive pulse (B) current as a recharge current and returning unused said rotor and sad flywheel angular kinetic energy transferred during said positive drive pulse (A) current back into said power supply through power rectifiers (146).

* * * * *